United States Patent
Walker et al.

(10) Patent No.: US 8,015,059 B2
(45) Date of Patent: Sep. 6, 2011

(54) METHOD AND APPARATUS FOR FACILITATING THE SALE OF SUBSCRIPTIONS TO PERIODICALS

(75) Inventors: Jay S. Walker, Ridgefield, CT (US); Andrew S. Van Luchene, Norwalk, CT (US); Deirdre O'Shea, New York, NY (US); Dean Alderucci, Ridgefield, CT (US)

(73) Assignee: Walker Digital, LLC, Stamford, CT (US)

( * ) Notice: Subject to any disclaimer, the term of this patent is extended or adjusted under 35 U.S.C. 154(b) by 988 days.

(21) Appl. No.: 11/611,931

(22) Filed: Dec. 18, 2006

(65) Prior Publication Data

US 2007/0112633 A1 May 17, 2007

Related U.S. Application Data

(63) Continuation of application No. 09/260,437, filed on Mar. 2, 1999, now Pat. No. 7,162,434, which is a continuation-in-part of application No. 08/841,791, filed on May 5, 1997, now Pat. No. 5,926,796, and a continuation-in-part of application No. 09/136,147, filed on Aug. 18, 1998, now abandoned, and a continuation-in-part of application No. 09/166,367, filed on Oct. 5, 1998, now abandoned, and a continuation-in-part of application No. 09/219,267, filed on Dec. 23, 1998.

(51) Int. Cl.
*G06Q 30/00* (2006.01)
(52) U.S. Cl. .................. 705/14.11; 705/14.38
(58) Field of Classification Search .............. 705/14, 705/26, 14.11, 14.38
See application file for complete search history.

(56) References Cited

U.S. PATENT DOCUMENTS 3,573,747 A 4/1971 Adams et al.
3,890,461 A 6/1975 Vogelman et al.
(Continued)

FOREIGN PATENT DOCUMENTS

EP 0 109 189 A1 5/1984
(Continued)

OTHER PUBLICATIONS

Horton, Liz, "Holiday gift subs up, some due to novel promotions," Folio: The Magazine for Magazine Management, vol. 21, No. 2, p. 39.*

(Continued)

*Primary Examiner* — John Van Bramer
(74) *Attorney, Agent, or Firm* — Fincham Downs, LLC; Carson C. K. Fincham

(57) ABSTRACT

A POS terminal receives a signal that indicates an item, for example, via a bar code scanner. The POS terminal ascertains whether the item is associated with an offer for a rebate. If so, a code is generated and output to the customer, such as on a printed receipt. The code is associated with an offer for a rebate in exchange for establishing a subscription to a periodical. If the customer subscribes to a required periodical, he will be credited the amount he paid for the item. Subsequently, the customer requests a subscription to a periodical from a subscription fulfillment house, and provides his code in conjunction with the request. If the code is valid, the customer is provided with a rebate. The rebate may be provided directly by the subscription fulfillment house (e.g. a credit to a credit card account) or may be provided by a merchant (e.g. a discount on a future purchase).

58 Claims, 18 Drawing Sheets

U.S. PATENT DOCUMENTS

| | | | |
|---|---|---|---|
| 4,108,361 A | 8/1978 | Krause | |
| 4,247,759 A | 1/1981 | Yuris et al. | |
| 4,253,157 A | 2/1981 | Kirschner et al. | 364/900 |
| 4,276,598 A | 6/1981 | Inoue et al. | |
| 4,323,770 A | 4/1982 | Dieulot et al. | |
| 4,449,186 A | 5/1984 | Kelly et al. | |
| 4,484,217 A | 11/1984 | Block et al. | |
| 4,494,197 A | 1/1985 | Troy et al. | |
| 4,553,222 A | 11/1985 | Kurland et al. | |
| 4,669,730 A | 6/1987 | Small | |
| 4,677,553 A | 6/1987 | Roberts et al. | |
| 4,689,742 A | 8/1987 | Troy et al. | |
| 4,723,212 A | 2/1988 | Mindrum et al. | |
| 4,751,728 A | 6/1988 | Treat | |
| 4,760,247 A | 7/1988 | Keane et al. | |
| 4,789,928 A | 12/1988 | Fujisaki | |
| 4,799,156 A | 1/1989 | Shavit et al. | |
| 4,815,741 A | 3/1989 | Small | |
| 4,833,609 A | 5/1989 | Grulke, Jr. | |
| 4,839,507 A | 6/1989 | May | 235/381 |
| 4,854,590 A | 8/1989 | Jolliff et al. | |
| 4,859,838 A | 8/1989 | Okiharu | |
| 4,876,592 A | 10/1989 | Von Kohorn | 358/84 |
| 4,882,473 A | 11/1989 | Bergeron et al. | |
| 4,903,201 A | 2/1990 | Wagner | |
| 4,910,672 A | 3/1990 | Off et al. | |
| 4,922,522 A | 5/1990 | Scanlon | |
| 4,937,853 A | 6/1990 | Brule et al. | |
| 4,947,028 A | 8/1990 | Gorog | |
| 4,982,337 A | 1/1991 | Burr et al. | |
| 4,982,346 A | 1/1991 | Girouard et al. | 364/550 |
| 4,984,155 A | 1/1991 | Geier et al. | |
| 4,993,714 A | 2/1991 | Golightly | |
| 5,021,953 A | 6/1991 | Webber | |
| 5,025,372 A | 6/1991 | Burton et al. | 364/406 |
| 5,056,019 A | 10/1991 | Schultz et al. | 364/405 |
| 5,119,295 A | 6/1992 | Kapur | |
| 5,136,501 A | 8/1992 | Silverman et al. | |
| 5,168,446 A | 12/1992 | Wiseman | |
| 5,173,851 A | 12/1992 | Off et al. | |
| 5,189,607 A | 2/1993 | Shirasaki et al. | 364/405 |
| 5,191,613 A | 3/1993 | Graziano et al. | |
| 5,202,826 A | 4/1993 | McCarthy | 364/405 |
| 5,223,698 A | 6/1993 | Kapur | |
| 5,224,034 A | 6/1993 | Katz et al. | |
| 5,235,415 A | 8/1993 | Bonicel et al. | |
| 5,239,165 A | 8/1993 | Novak | |
| 5,243,515 A | 9/1993 | Lee | |
| 5,250,789 A * | 10/1993 | Johnsen | 705/14.23 |
| 5,262,941 A | 11/1993 | Saldin et al. | |
| 5,283,731 A | 2/1994 | Lalonde et al. | |
| 5,287,268 A | 2/1994 | McCarthy | 364/405 |
| 5,297,026 A | 3/1994 | Hoffman | |
| 5,297,031 A | 3/1994 | Gutterman et al. | |
| 5,315,093 A | 5/1994 | Stewart | 235/381 |
| 5,324,922 A | 6/1994 | Roberts | 235/375 |
| 5,329,589 A | 7/1994 | Fraser et al. | |
| 5,353,218 A | 10/1994 | DeLapa et al. | 364/101 |
| 5,361,199 A | 11/1994 | Shoquist et al. | |
| 5,380,991 A | 1/1995 | Valencia | 235/383 |
| 5,404,291 A | 4/1995 | Kerr et al. | |
| RE34,954 E | 5/1995 | Haber et al. | |
| 5,413,341 A | 5/1995 | Lieberman | |
| 5,415,264 A | 5/1995 | Menoud | 194/217 |
| 5,420,914 A | 5/1995 | Blumhardt | |
| 5,426,281 A | 6/1995 | Abecassis | |
| 5,428,606 A | 6/1995 | Moskowitz | 370/60 |
| 5,450,938 A | 9/1995 | Rademacher | 194/206 |
| 5,467,269 A * | 11/1995 | Flaten | 705/14.17 |
| 5,515,270 A | 5/1996 | Weinblatt | |
| 5,517,555 A | 5/1996 | Amadon et al. | |
| 5,519,769 A | 5/1996 | Weinberger et al. | |
| 5,521,364 A | 5/1996 | Kimura et al. | |
| 5,528,490 A | 6/1996 | Hill | |
| 5,537,314 A | 7/1996 | Kanter | 364/406 |
| 5,544,040 A | 8/1996 | Gerbaulet | |
| 5,553,131 A | 9/1996 | Minervino, Jr. et al. | |
| 5,606,602 A | 2/1997 | Johnson et al. | |
| 5,612,868 A | 3/1997 | Off et al. | |
| 5,621,812 A | 4/1997 | Deaton et al. | |
| 5,630,103 A | 5/1997 | Smith et al. | 395/500 |
| 5,636,346 A | 6/1997 | Saxe | |
| 5,638,457 A | 6/1997 | Deaton et al. | |
| 5,642,279 A | 6/1997 | Bloomberg et al. | |
| 5,642,484 A | 6/1997 | Harrison, III et al. | 395/214 |
| 5,642,485 A | 6/1997 | Deaton et al. | |
| 5,644,723 A | 7/1997 | Deaton et al. | |
| 5,652,421 A | 7/1997 | Veeneman et al. | |
| 5,655,007 A | 8/1997 | McAllister | 379/91.01 |
| 5,666,649 A | 9/1997 | Dent | |
| 5,673,317 A | 9/1997 | Cooper et al. | |
| 5,689,100 A | 11/1997 | Carrithers et al. | 235/380 |
| 5,689,652 A | 11/1997 | Lupien et al. | |
| 5,694,546 A | 12/1997 | Reisman | 395/200.9 |
| 5,708,782 A | 1/1998 | Larson et al. | 395/214 |
| 5,710,887 A | 1/1998 | Chelliah et al. | |
| 5,715,402 A | 2/1998 | Popolo | |
| 5,721,827 A | 2/1998 | Logan et al. | |
| 5,727,153 A | 3/1998 | Powell | |
| 5,729,693 A | 3/1998 | Holda-Fleck | |
| 5,732,400 A | 3/1998 | Mandler et al. | |
| 5,734,838 A | 3/1998 | Robinson et al. | |
| 5,734,890 A | 3/1998 | Case et al. | |
| 5,745,882 A | 4/1998 | Bixler et al. | |
| 5,758,328 A | 5/1998 | Giovannoli | |
| 5,759,101 A * | 6/1998 | Von Kohorn | 463/40 |
| 5,774,868 A | 6/1998 | Cragun et al. | |
| 5,794,207 A | 8/1998 | Walker et al. | |
| 5,794,210 A | 8/1998 | Goldhaber et al. | 705/14 |
| 5,794,219 A | 8/1998 | Brown | |
| 5,794,220 A | 8/1998 | Hunt | |
| 5,809,144 A | 9/1998 | Sirbu et al. | |
| 5,812,769 A | 9/1998 | Graber et al. | 705/26 |
| 5,819,241 A | 10/1998 | Reiter | |
| 5,822,736 A | 10/1998 | Hartman et al. | |
| 5,825,881 A | 10/1998 | Colvin, Sr. | |
| 5,832,457 A | 11/1998 | O'Brien et al. | |
| 5,835,896 A | 11/1998 | Fisher et al. | |
| 5,839,119 A | 11/1998 | Krsul et al. | |
| 5,845,259 A | 12/1998 | West et al. | 705/14 |
| 5,848,396 A | 12/1998 | Gerace | |
| 5,855,008 A | 12/1998 | Goldhaber et al. | |
| 5,857,175 A | 1/1999 | Day et al. | |
| 5,864,757 A | 1/1999 | Parker | |
| 5,864,822 A | 1/1999 | Baker, III | 705/14 |
| 5,870,030 A | 2/1999 | DeLuca et al. | |
| 5,905,246 A | 5/1999 | Fajkowski | |
| 5,918,211 A | 6/1999 | Sloane | |
| 5,923,016 A | 7/1999 | Fredregill et al. | 235/380 |
| 5,924,080 A | 7/1999 | Johnsen | |
| 5,926,796 A | 7/1999 | Walker et al. | 705/16 |
| 5,937,037 A | 8/1999 | Kamel et al. | |
| 5,937,391 A | 8/1999 | Ikeda et al. | 705/14 |
| 5,956,695 A | 9/1999 | Carrithers et al. | 705/14 |
| 5,970,469 A | 10/1999 | Scroggie et al. | |
| 5,974,399 A | 10/1999 | Giuliani et al. | |
| 5,991,739 A | 11/1999 | Cupps et al. | 705/26 |
| 5,991,740 A | 11/1999 | Messer | 705/27 |
| 5,995,942 A | 11/1999 | Smith et al. | 705/14 |
| 5,999,914 A | 12/1999 | Blinn et al. | 705/26 |
| 6,014,634 A | 1/2000 | Scroggie et al. | |
| 6,014,641 A | 1/2000 | Loeb et al. | 705/34 |
| 6,016,504 A | 1/2000 | Arnold et al. | 705/26 |
| 6,021,390 A | 2/2000 | Satoh et al. | 705/1 |
| 6,024,288 A * | 2/2000 | Gottlich et al. | 235/493 |
| 6,029,139 A | 2/2000 | Cunningham et al. | 705/10 |
| 6,029,141 A | 2/2000 | Bezos et al. | 705/27 |
| 6,049,778 A | 4/2000 | Walker et al. | |
| 6,052,730 A | 4/2000 | Felciano | |
| 6,055,513 A | 4/2000 | Katz et al. | |
| 6,059,142 A | 5/2000 | Wittern, Jr. et al. | |
| 6,061,660 A | 5/2000 | Eggleston et al. | 705/14 |
| 6,076,068 A | 6/2000 | DeLapa et al. | |
| 6,076,069 A | 6/2000 | Laor | |
| 6,124,799 A | 9/2000 | Parker | |
| 6,144,948 A | 11/2000 | Walker et al. | |
| 6,173,274 B1 | 1/2001 | Ryan, Jr. | |

| | | | |
|---|---|---|---|
| 6,178,411 B1 | 1/2001 | Reiter | |
| 6,185,545 B1 | 2/2001 | Resnick et al. | |
| 6,222,914 B1 | 4/2001 | McMullin | 379/144 |
| 6,229,879 B1 | 5/2001 | Walker et al. | 379/88 |
| 6,259,908 B1 | 7/2001 | Austin | |
| 6,317,723 B1 | 11/2001 | Walker et al. | 705/16 |
| 6,327,580 B1 | 12/2001 | Pierce et al. | |
| 6,332,128 B1 | 12/2001 | Nicholson | |
| 6,334,112 B1 | 12/2001 | Walker et al. | 705/23 |
| 6,334,113 B1 | 12/2001 | Walker et al. | 705/23 |
| 6,336,095 B1 | 1/2002 | Rosen | |
| 6,336,099 B1 | 1/2002 | Barnett et al. | |
| 6,349,288 B1 | 2/2002 | Barber | |
| 6,393,407 B1 | 5/2002 | Middleton et al. | |
| 6,405,174 B1 | 6/2002 | Walker et al. | |
| 6,415,270 B1 | 7/2002 | Rackson et al. | |
| 6,456,981 B1 | 9/2002 | Dejaeger et al. | |
| 6,606,608 B1 | 8/2003 | Bezos et al. | |
| 6,647,373 B1 | 11/2003 | Carlton-Foss | |
| 6,965,870 B1 | 11/2005 | Petras et al. | |
| 7,085,740 B1 | 8/2006 | Meyers | |
| 2001/0014868 A1 | 8/2001 | Herz et al. | |

FOREIGN PATENT DOCUMENTS

| | | |
|---|---|---|
| EP | 0 351 335 A | 1/1990 |
| EP | 0 363 122 A2 | 4/1990 |
| EP | 512413 A | 11/1992 |
| EP | 0 607 686 A2 | 7/1994 |
| EP | 809202 | 11/1997 |
| EP | 0 902 381 A2 | 3/1999 |
| FR | 2 682 502 A | 4/1993 |
| FR | 2 757 656 A1 | 6/1998 |
| GB | 2 274 349 A | 7/1994 |
| GB | 2 299 691 A | 10/1996 |
| JP | 05257950 | 10/1993 |
| JP | 07-231309 | 8/1995 |
| JP | 10187318 A | 7/1998 |
| WO | WO 95/03570 | 2/1995 |
| WO | WO 95 21428 A | 8/1995 |
| WO | WO 96/31848 | 10/1996 |
| WO | WO 96/31848 A2 | 10/1996 |
| WO | WO 96/36926 | 11/1996 |
| WO | WO 97/20279 | 6/1997 |
| WO | WO 97/35441 | 9/1997 |
| WO | WO 98/06050 | 2/1998 |
| WO | WO 98/26363 | 6/1998 |
| WO | WO 98/28699 | 7/1998 |
| WO | WO 98/34187 | 8/1998 |
| WO | WO 00/21400 | 4/2000 |

OTHER PUBLICATIONS

Horton, Liz, "Holiday gift subs up, some due to novel promotions", Feb. 1, 1992, Folio: The Magazine for Magazine Management, vol. 21, No. 2, pg. 39.*

Tedesco, Richard, "Pactel pushes 'Net access." Broadcasting & Cable, Jun. 3, 1996, pp. 64-65. 2pp.

Colman, Price, "Cross-marketing cuts cable bills." Broadcasting & Cable, Jul. 15, 1996, p. 44 3pp.

Fleming et al., "European Banks, Insurance Firms Cross Into Each Other's Territory." Wall Street Journal. (Europe) Feb. 20, 1991, p. 9. 4 pp.

Howland, Jennifer, "National Distributors: Scanning the Future," Folio: The Magazine for Magazine Management, vol. 14, p. 69, Feb. 1985. 10 pp.

Wood, Wally, "Circulation Marketing: Let Your Magazine Do the Selling," Folio: The Magazine for Magazine Management, vol. 14, p. 78, Jun. 1985. 9 pp.

"Magazine Subscription Sales Center—Where buying subscriptions is easy!", Customer Service Information, Interactive Magazine Sales, Inc, Email: aim@panix com. 2 pp.

"Phoenix Papers to Sell Merchandise to Build Awareness", Editor & Publisher, Sep. 17, 1988, vol. 121, Issue 38, p. 23, ISSN: 0013-094X. 2 pp.

Carlson, Lynn, "Decreasing Your Direct-Mail Costs", Folio: The Magazine for Magazine Management, Sep. 1, 1992, vol. 21, Issue 9, pp. 81-82, ISSN: 0046-4333. 3 pp.

Hochwald, Lambeth, "Sub sources that break with tradition", Folio: The Magazine for Magazine Management, May 1, 1994, vol. 23, Issue 8, pp. 46-48, ISSN: 0046-4333. 4 pp.

Kelly, Keith J., "Hearst opens a cyberspace newsstand", Advertising Age, Jan. 30, 1995, vol. 66, Issue 5, p. 14, ISSN: 0001-8899. 2 pp.

Kelly, Keith, J., "Publishers pine for cyber-profits", Advertising Age, Mar. 13, 1995, vol. 66, Issue 11, p. S-22, ISSN: 0001-8899,2 pp.

"Hearst Corporation launches 'The Multimedia Newsstand'", Link-Up, Mar./Apr. 1995, vol. 12, Issue 2, pp. 1, 36, ISSN: 0739-988X. 3 pp.

Hodges, Jane, "'WSJ' puts squeeze on Web subscriptions", Advertising Age, Apr. 29, 1996, vol. 67, Issue 18, p. 34, ISSN: 0001-8899. 2 pp.

Tedesco, Richard, "Time launches 'Net subscription service", Broadcasting & Cable, Nov. 11, 1996, vol. 126, Issue 47, p. 65, ISSN: 1068-6827. 2 pp.

Case, Tony, "The electronic newsstand branches out", Folio: The Magazine for Magazine Management, Apr. 1, 1997, vol. 26, Issue 5, p. 13, ISSN: 0046-4333. 2 pp.

Krol, Carol, "Magazine site to focus on commerce", Advertising Age, Aug. 18, 1997, vol. 68, Issue 33, p. 18, ISSN: 0001-8899. 2 pp.

Manly, Lorne, "A Newsstand for the Electronic Age?", ABI/Inform, Global Edition, Sep. 15, 1993, p. 17. 2 pp.

Lacher, Lisa, "Coupon Gimmick Registers Profits", Business Record, Dec. 7, 1987, p. 1. 2 pp.

Stevens, Lawrence, "Hypermarket Challenge", Computerworld, Dec. 19, 1988, p. 25. 2 pp.

"Safeway Introduces Store-Generated Coupons", PR Newswire, May 1, 1990. 1 pp.

Blattenberg, Robert C. et al., "Interactive Marketing: Exploiting the Age of Addressability", Sloan Management Review, Sep. 22, 1991, p. 5. 15 pp.

McDowell, Bill, "Frequency Marketing Builds Repeat Business; Management", Building Supply Home Centers, Aug. 1993, No. 2, vol. 165, p. 96. 5 pp.

McKinney, Jeff, "Merchants Program Could Pay Off for Provident", The Cincinnati Enquirer, Mar. 24, 1996, Financial Section, p. E02. 2 pp.

Wagner, Jim, "Cameras Tell Mall What Door You Use, How Often You Go", Albuquerque Tribune, Aug. 9, 1996, Evening Section, p. A3. 2 pp.

Fickenscher, Lisa, "AMEX to Start Rewards Program with Discounts on Merchandise", The American Banker, Oct. 18, 1996, Credit/Debit/ATMs, p. 10. 2 pp.

Fitzgerald, Kate, "AMEX Program Moves Loyalty to Next Level: Custom Extras Finds A Medium Customers Can't Ignore, Billing Statements", Advertising Age, Nov. 4, 1996, News Section, p. 2. 2 pp.

"Tecmark Reward Terminal", Tecmark Services, Inc., (http //www tecmarkinc com/terminal htm), download date: Mar. 20, 1997. 1 pg.

Fickenscher, Lisa, "Merchant: American Express Seeks to Mine Its Data on Cardholder Spending Patterns", The American Banker, Mar. 24, 1997, Credit/Debit/ATMs Section, p. 20. 2 pp.

"Dispensing the Future", Electronic Payments International, May 1997, Feature Section, p. 12. 5 pp.

"Industry Briefs", Card News, Jun. 9, 1997, Vo. 12, No. 11. 2 pp.

Hoeschen, Brad, "Brookfield Square Hopes Mall Card Strikes a Chord", Business Journal—Milwaukee, Sep. 12, 1997, Vo. 14, No. 50, p. 19. 2 pp.

"Acxiom Case-in-Pont Case Study—Bloomingdale's", Acxiom, (http www acxiom com-cs-b htm), download date: Sep. 23, 1997. 3 pp.

"NCR 7452 Workstation—Beyond Traditional POS", NCR Corporation, (http //www ncr com/product/retail/products/catalog/7452 shtm), download date: Sep. 23, 1997. 3 pp.

"New Partners, More Exciting Rewards: The Membership Rewards Program for 1998", American Express, (http www Americanexpress com/rewards/news/docs/1998new_mr shtml), download date: Mar. 12, 1998. 38 pp.

Hemsley, Steven, "Research and Destroy; Point-of-Purchase Research Provides Brand Managers with Essential Information About Customer Trends and Enables Them to Achieve the Maximum from their Displays", Marketing Week, Apr. 16, 1998, Point-of-Purchase Selection, pp. 33-36. 3 pp.

"MyPoints Universal Rewards Currency", MotivationNet, Inc. Brochure, Apr. 1998. 14 pp.

"Wells Park Group Launches 'V.I.P. Rewards'; the Most Comprehensive Relationship Marketing Program Ever Created by a Mall Developer", Business Wire, May 19, 1998, 2 pp.

Amato-McCoy, Deena, "Co-Branded ACME Credit Card Rewards Loyal Users", Supermarket News, Jun. 15, 1998, p. 17. 2 pp.

"ACME Markets, U.S. Bancorp Debut Visa Rewards Card", Card News, Jun. 22, 1998, vol. 13, No. 12. 1 pg.

Rubenstein, Ed, "Prepaid Program Lets Galleria Guests Dine 'A La Card'", Nations Restaurant News, Jun. 29, 1998, p. 43. 1 pg.

"DataCard Partners with CSI to Offer Card-Based Loyalty Solution to Merchants", Business Wire, Jul. 9, 1998. 1 pg.

Albright, Mark, "Grocery Savings via Web Coupons", St. Petersburg Times, Jul. 22, 1998, Wednesday O South Pinellas Edition, Business Section, p. 1E. 2 pp.

"Reaching Out in New Directions", Introducing U$A Value Exchange, First Data Corporation, Brochure. 31 pp.

"Frequent Shopper Programs are Taking Off", Grocery Marketing, Vo. 63, No. 1, p. 54, Jan. 1997. 2 pp.

Campos, Frellie, "Discount Shopping Program Extended to Residents", Pacific Business News, vol. 36, Issue 27, Sep. 21, 1998. 3pp.

"Global Second-Generation, and Frequent-Buyer Set New Trends", Marketing News, Vo. 19, No. 12, p. 18, Jun. 7, 1985. 1 pg. 1 pg.

McIntyre, Faye, "Small Businesses May Prefer Alternatives to Advertising", South Dakota Business Review, Vo. 47, No. 4, Jun. 1989. 4 pp.

"Staples The Office Superstore to Participate in Visa 'Rewards for Your Home' Promotion; Savings Will be Offered to Thousands of Visa and Staples Customers", Business Wire, Dialog File 621, Mar. 25, 1996. 2 pp.

"Retailers in Small N.D. Town Join Forces", Tire Business, vol. 14, No. 2, p. 10, Apr. 29, 1996. 3 pp.

Reese, Diane, "Revitalizing Single-Copy Sales," Folio: The Magazine for Magazine Management, vol. 15, p. 84, Feb. 1986. 14 pp.

Joyce, Walter, "Muscular Merchandising; Column," Folio: The Magazine for Magazine Management, vol. 15, P. 124, Jun. 1986. 5 pp.

Donaton, Scott, "Gift Subscriptions Find Retail Niche," Advertising Age, News Section, p. 37, Jul. 16, 1990. 2 pp.

Jaben, Jan, "Magazine Gift-Giving Made Simple at Retail Outlets; Time Inc., Hearst, Meredith Test Subscriber Systems' Method of Selling Gift Subscriptions; News," Folio's Publishing News, vol. 3, No. 2, p. 15, Feb. 15, 1991. 3 pp.

"The Super Subs," Precision Marketing, No. 0, vol. 0, p. 23, Oct. 24, 1994. 5 pp.

Cyr, Diane, "Distribution Woes; Declining Newsstand Circulation; Includes Related Article on Preventing Newsstand Fraud," Folio: The Magazine for Magazine Management, vol. 23, No. 19, p. 170, Jan. 1995. 5 pp.

Schnuer, Jenna, "Overnight Options Add to Distribution Mix; Distribution of 'Inside Sports' Magazine," Folio: The Magazine for Magazine Management, vol. 24, No. 4, p. 19, Mar. 1, 1995. 2 pp.

Hochwald, Lambeth, "Postal Blues: Circulators Cope with the Rate Crunch," Folio: The Magazine for Magazine Management, vol. 24, No. 8, p. 54, May 1, 1995. 4 pp.

"Tretorn Offers Magazine Promo," Adweek, New England Edition, May 1, 1995. 1 pg.

Wilson, Steve, "Out of Print—But Not Business; Magazines Move Away from Print in Favor of Electronic Publishing," Folio: The Magazine for Magazine Management, vol. 24, No. 8, p. 22, May 1, 1995. 2 pp.

"Lottoworld," Mediaweek, vol. 5, No. 19, p. 16(1), May 8, 1995. 1 pg.

Miller, Paul, "Magazine Deal Lacks Catalog Appeal; Brief Article," Folio: The Magazine for Magazine Management, vol. 24, No. 11, p. 30, Jun. 15, 1995. 2 pp.

Graham, Anne, "Nonmember Subs—or Not? Nonmember Subscriptions to Association Magazines; Includes Tips from Publishers," Folio: The Magazine for Magazine Management, vol. 24, No. 10, p. 47, Jun. 1, 1995. 4 pp.

Garratt, David, "What Premium on On-Cover Premiums?" Folio: The Magazine for Magazine Management, vol. 24, No. 16, p. 53, Oct. 1, 1995. 3 pp.

Wilson, Steve, "Directory Assistance: A Buyer'S Guide Can Give You a Big Boost in Revenue and Attract New Advertisers and Subscribers," Folio: The Magazine for Magazine Management, vol. 24, No. 16, p. 40, Oct. 1, 1995. 3 pp.

Guy, Pat, "A Gift Off the Rack", USA Today, Dec. 19, 1990 at p. 2B. 2 pp.

"HFS Incorporated And Hachette Filipacchi Magazine; Announce Launch If Century 21 House & Home Magazine; No. 1 Real Estate Company And Leading Publisher Of Home-Related Magazines To Use Unparalleled Century 21® Brand Awareness And Customer Base In Developing Magazine With Broad Consumer Appeal; Latest In Series Of Century 21," Business Wire, Nov. 20, 1995. 2 pp.

Hochwald, Lambeth, "Circulation Secrets: Nine Steps to a Successful Circulation Launch Strategy; Includes List of Resources," Folio: The Magazine for Magazine Management, vol. 25, No. 2, p. 53, Feb. 1, 1996. 5 pp.

Kerwin, Ann Marie, "Notably At the Newsstand: Instyle, Financial World Push for Greater Single-Copy Sales," Inside Media, vol. 8, No. 3, p. 26, Feb. 7, 1996. 2 pp.

Schnuer, Jenna, "A World Without Magazines? Consumers Weigh in; Survey of Consumers Indicates That Magazines Are Most Dispensable Form of Communication for 37% of Respondents," Folio: The Magazine for Magazine Management, vol. 25, No. 9, p. 16, Jun. 1, 1996. 2 pp.

Horton, Liz, "Holiday gift Subs Up, Some Due to Novel Promotions", Folio Magazine, Feb. 1, 1992 at p. 39. 1 pg.

Love, Barbara, "Selling Subscriptions at Newsstands", Folio Magazine, Jun. 1, 1994 at p. 10. 1 pp.

Love, Barbara, "Folio: Plus Circulation; Techniques for Managing Magazine Circulation", Folio Magazine, Jan. 1995 at p. 159. 3 pp.

Adams, Mark, "Capell Reports Sales Drop At Stands", Mediaweek, Mar. 11, 1996 at p. 27. 1 pg.

Fried, Lisa I., "US news rebate offer under fire", Jan. 1, 1991, Folio, v20, nl, p. 28.

Office Action for U.S. Appl. No. 08/841,791, dated Mar. 20, 1998, 7 pp.

Office Action for U.S. Appl. No. 08/841,791, dated May 5, 1998, 7 pp.

Notice of Allowance for U.S. Appl. No. 08/841,791, dated Jan. 19, 1999, 5 pp.

Notice of Allowance for U.S. Appl. No. 09/073,165, dated Jul. 12, 2002, 5pp.

Office Action for U.S. Appl. No. 09/073,165, dated Mar. 3, 2001, 5pp.

Reilly, Brian, "Upselling strategies hit the net"; Net Marketing, Dec. 1996, 1 pg.

Yoshihara, Nancy, "New magazines try to reach Asian businesses. The fledging English language publications seek readers on both sides of the Pacific"; Los Angeles Times, Oct. 2, 1989, 2 pp.

Eisman, Regina, "Incentive marketing: the Energy of synergy"; Incentive, Nov. 1992, 1 pg.

Spoor, Dana, "Selling a free phone"; Cellular Business, pp. 58-62, Feb. 1994, 5 pp.

Anonymous, "Manufacturers shine with cross-promotional prowess"; Discount Store News, New York, Aug. 5, 1996, vol. 35, Iss 15, p. 19, 2 pp.

Donlon, Brian, "Cable industry channels its efforts in April; sampler of specials"; USA Today. McLean, VA Mar. 29, 1990, p. 3 D, 2 pp.

Oslund, John J., "The battle is joined//State's local long-distance lures US West's competitors"; Star Tribune, Feb. 12, 1996, 6 pp.

Notice of Allowance for U.S. Appl. No. 09/335,644, dated Jul. 16, 2001, 5pp.

Office Action for U.S. Appl. No. 09/335,644, dated May. 9, 2001, 5pp.

Office Action for U.S. Appl. No. 09/998,760, dated Aug. 29, 2006, 6pp.

Final Office Action for U.S. Appl. No. 09/998,760, dated Apr. 13, 2007, 6 pp.

Notice of Allowance for U.S. Appl. No. 09/998,760, dated Sep. 26, 2008, 8pp.

Office Action for U.S. Appl. No. 11/832,943, dated Sep. 14, 2010, 5pp.

Interview Summary for U.S. Appl. No. 09/073,082, dated Dec. 19, 2002, 3 pp.

Office Action for U.S. Appl. No. 09/073,082, dated Jul. 3, 2001, 6 pp.
Notice of Allowance for U.S. Appl. No. 09/073,082, dated May 2, 2002, 2 pp.
Notice of Allowance for U.S. Appl. No. 09/073,082, dated Sep. 30, 2002, 6 pp.
Notice of Allowance for U.S. Appl. No. 09/073,169, dated Jul. 2, 2001, 6 pp.
Notice of Allowance for U.S. Appl. No. 09/072,715, dated Jul. 2, 2001, 6 pp.
Office Action for U.S. Appl. No. 09/136,147 dated May 11, 2001, 5 pp.
Office Action for U.S. Appl. No. 09/136,147 dated Jun. 6, 2001, 10 pp.
Office Action for U.S. Appl. No. 09/136,147 dated Apr. 16, 2004, 10 pp.
Office Action for U.S. Appl. No. 09/166,367 dated Sep. 29, 2000, 26 pp.
Office Action for U.S. Appl. No. 09/166,367 dated Mar. 27, 2001, 23 pp.
Office Action for U.S. Appl. No. 09/166,367 dated Sep. 24, 2001, 30 pp.
Office Action for U.S. Appl. No. 09/166,367, dated May 15, 2002, 29 pp.
Office Action for U.S. Appl. No. 09/219,267 dated May 17, 2001, 18 pp.
Office Action for U.S. Appl. No. 09/219,267 dated Feb. 14, 2002, 17 pp.
Office Action for U.S. Appl. No. 09/219,267 dated Apr. 22, 2003, 19 pp.
Office Action for U.S. Appl. No. 09/219267 dated Jan. 9, 2004, 27 pp.
Office Action for U.S. Appl. No. 09/219,267 dated Dec. 14, 2004, 24 pp.
Office Action for U.S. Appl. No. 09/219,267 dated Mar. 6, 2006, 20 pp.
Office Action for U.S. Appl. No. 09/219,267 dated Sep. 7, 2007, 18 pp.
Office Action for U.S. Appl. No. 09/219,267 dated Jun. 13, 2008, 13 pp.
Office Action for U.S. Appl. No. 09/219,267 dated Mar. 10, 2009, 16 pp.
Office Action for U.S. Appl. No. 09/219,267 dated Jan. 5, 2010, 16 pp.
Notice of Allowance for U.S. Appl. No. 09/219,267 dated Aug. 30, 2010, 7 pp.
Office Action for U.S. Appl. No. 11/423,481 dated Jan. 25, 2007, 6 pp.
Office Action for U.S. Appl. No. 11/423,481 dated Oct. 9, 2007, 25 pp.
Office Action for U.S. Appl. No. 11/423,481 dated Jun. 2, 2008, 18 pp.
Office Action for U.S. Appl. No. 11/423,481 dated Mar. 5, 2009, 18 pp.
Notice of Allowanc for U.S. Appl. No. 11/423,481 dated Aug. 31, 2010, 7 pp.
Office Action for U.S. Appl. No. 11/423,493 dated Jan. 26, 2007, 6 pp.
Office Action for U.S. Appl. No. 11/423,493 dated Oct. 18, 2007, 21 pp.
Office Action for U.S. Appl. No. 11/423,498 dated Jan. 26, 2007, 6 pp.
Office Action for U.S. Appl. No. 11/423,498 dated Oct. 18, 2007, 10 pp.
Office Action for U.S. Appl. No. 09/260,437 dated Jun. 4, 2001, 4 pp.
Office Action for U.S. Appl. No. 09/260,437 dated Aug. 27, 2001, 7 pp.
Office Action for U.S. Appl. No. 09/260,437 dated May 29, 2002, 7 pp.
Office Action for U.S. Appl. No. 09/260,437 dated Dec. 18, 2002, 8 pp.
Office Action for U.S. Appl. No. 09/260,437 dated Apr. 5, 2004, 10 pp.
Notice of Allowance for U.S. Appl. No. 09/260,437 dated Aug. 23, 2005, 6 pp.
Notice of Allowance for U.S. Appl. No. 09/260,437 dated Mar. 20, 2006, 6 pp.
Notice of Allowance for U.S. Appl. No. 09/260,437 dated Sep. 25, 2006, 6 pp.
Office Action for U.S. Appl. No. 09/510,558 dated May 9, 2003, 15 pp.
Office Action for U.S. Appl. No. 09/510,558 dated Feb. 9, 2004, 28 pp.
Office Action for U.S. Appl. No. 09/510,558 dated Dec. 29, 2004, 31 pp.
Office Action for U.S. Appl. No. 09/510,558 dated May 1, 2006, 32 pp.
Examiner's Answer for U.S. Appl. No. 09/510,558 dated Jun. 20, 2006, 2 pp.
Office Action for U.S. Appl. No. 09/510,558 dated Apr. 8, 2008, 9 pp.
Office Action for U.S. Appl. No. 09/510,558 dated Oct. 1, 2008, 11 pp.
Office Action for U.S. Appl. No. 09/510,558 dated Jun. 10, 2009, 11 pp.
Office Action for U.S. Appl. No. 09/510,558 dated Jul. 6, 2010, 12 pp.
Milestone Events Making Sprint History 1990-1995 download date Jul. 27, 2004, 2 pp.
Surviving the Great Depression, www. geocities.com/ Athens/column/clbrown2.html, download date Nov. 13, 2003, 2 pp.
"The Mobile: 20 Years Young", http: motoinfo. Motorola. Com/ motoinfo/$20^{th}$ anniversary/docs/timeline.pdf, 2 pp.
Qualcomm About Qualcomm—History / Key Milestones, www. qualcomm/about/history/ html), download date Jul 27, 2004, 5 pp.
IAFC Launches NextCard(sm)—The First True Internet VISA, http: //nextcard.com/release1 html), Sep. 14, 1999, 2 pp.
Goldberg, Jeff "Cellular phone information from point.com", http: www. point com/articles/489 asp) download date Nov. 16, 2000, 7 pp.
Bid to Win, The Best Auction Deals on the . . . download date Oct. 29, 1998, 2 pp.
Crump, Stuart F. Jr., "Faith Goes Cellular", Home Office Computing, Jan. 1994, 4 pp.
Sabatini, Patricia, "Card Sharks", Pittsburgh Post-Gazette, Feb. 4, 1996, 8 pp.
Bryant, Adam, "Shaking Up Air Fares' Status Quo; Enterpreneur Seeks Break For Last-Minute Business Flyers", The New York Times, Apr. 1, 1997, 4 pp.
Internet Mortgage Service Eliminates Loan Agents And Passes Commissions On To The Consumer, Business Wire, Jun. 30, 1997, 2 pp.
Holton, Lisa, "Cable Efforts Help Insurers Tune Into New Markets", Card Marketing, Jan. 1999, 2 pp.
Shook, David, "Rebate Limits Can Be A Pain For Consumers", The Buffalo News, Jan. 5, 1999, 2 pp.
Samuelson, Paul, "Economics Ninth Edition", McGraw Hill Book Company, 1973, 10 pp.
Blattberg, Robert C. and Levin, Alan, "Modeling The Effectiveness and Profitability of Trade Promotions," Marketing Science, 1987, 23 pp.
Jansen, Elizabeth, Yakking It Up: For Wireless Services in U.S . . . Wall Street Journal, Apr. 28, 1988, 5 pp.
Foster, Ed, Can mixing 'cookies' with online marketing be a recipe for heartburn?, InfoWorld, Jul. 22, 1996, 2 pp.
Patch, Kimberly, Sled, InterNIC debut internet services, PC Week, May 16, 1994, 1 pg.
Marn, Michael V., Rosiello, Robert L. :Managing price, gaining profit, McKinsey Quarterly, Autumn 1992, 10 pp.
Howard, Lisa A., RM Sees outsourcing challenge, National Underwriter Property & Casualty-Risk & Benefits Management, Nov. 24, 1997, 2 pp.
Shamrock Technology Co. establishes No. American HQ as monitor manufacturer continues market expansion, Business Wire, Mar. 25, 1997, 2 pp.
Website: "MCI Freeflix Free Video Rental Program", (http //www mci com/aboutus/products/prepaid/promotional shtm), download date: Apr. 21, 1998, 1 pg.
Website: "MCI PrePaid Card Retail Promotional Opportunities", (http //www mci com/aboutus/products/glossary/home/freeflix shtml), download date: Apr. 21, 1998, 2 pp.

Rozen, Miriam, "What's New in Joint Promotions," The New York Times, Mar. 10, 1985, Financial Desk, Section 3, at p. 23, col. 1, 1 pg.
Katcher, P. Royal, "Getting Products to Consumers; The Basics of Retailing, Part 2," Automotive Marketing, May 1990 vol. 19, No. 5, 5 pp.
Cards Briefs: Stored-Value Card Designed for Casinos, Oct. 31, 1995, Copyright 1995 American Banker, Inc. (http://web.lexis-nexis.com/In.universe/s. .tz&_md5=b625be0ceccfc8378819201ad83c41), 1 pg.
Website: "Apollo host Computer," downloaded from http//www.Apollo.com, undated, 4 pp.
Website: "The Saber Group: Welcome to Sabre Decision Technologies," downloaded from http//www.sdt.com, undated, 6 pp.
Ritter, Jeffery B., "Scope of the Uniform Commercial Code: Computer Contracting Cases and Electrical Commercial Practices," 45 Bus. Law 2533, Aug. 1990, 20 pp.
Speidel, Richard E. et al., "Impact of Electronic Contracting on Contract Formation Under Revised UCC Article 2, sales," C878 ALI-ABA 335, Dec. 9,1993, 4 pp.
"Cyberbid", Net Fun Ltd., Homepage: www.cyberbid.com., Copyright 1995-1996, 9 pp.
Lacher, Lisa. "Coupon Gimmick Registers Profits," Business Dateline, vol. 83, No. 47, Sec. 1, Dec. 7, 1987, 2 pp.
Stevens, Lawrence. "Hypermarket Challenge," Computerworld, Software and Services section, pg. 25, Dec. 19, 1988, 2 pp.
Kuttner, Robert. "Computers May Turn the World into One Big Commodities Pit," Business Week, Economic Viewpoint section, No. 3123, p. 17, Sep. 11, 1989, 2 pp.
Golden, Fran. "AAL's Riga Doubts Marketel's Appeal to Retailers; Chris Riga of American Airlines," Travel Weekly, vol. 48, No. 91, p. 4, Nov. 13, 1989, 2 pp.
Schrage, Michael. "An Experiment in Economic Theory; Labs Testing Real Markets," The Record, Business section, p. B01, Nov. 26, 1989, 3 pp.
Pelline, Jeff "Traveler's Bidding on Airline Tickets SF Firm Offers Chance for Cut-Rate Fares," The San Francisco Chronicle, News section, p. A4, Aug. 19, 1991, 3 pp.
Del Rosso, Laura. "Ticket-Bidding Firm Closes Its Doors; Marketel International," Travel Weekly, vol. 51, No. 21, p. 1, Mar. 12, 1992, 2 pp.
Website: "Classifieds2000: The Internet Classifieds," Classifieds 2000, Inc., Homepage: www.classifieds2000.com/cgi-cls/Display.exe?C2K+aboutus, download date: Aug. 6, 1997, 3 pp.
Brochure: "Tired of Shopping for the Best Home Loan?" Mortgage Loan Specialists, Aug. 7, 1997, 2 pp.
Website: "The Loan Process," Mortgage Loan Specialists, Homepage: www.sdtech.com/mls/process.html, download date: Aug. 7, 1997, 3 pp.
Website: "HomeShark Refinance Check," HomeShark, Inc., Homepage: www.homeshark.com/homewatch/refi/refistep 1.htm, download date: Aug. 31, 1997, 6 pp.
Website: "Tradingfloor.com," Homepage: www.tradingfloor.com/info/htm, download date; Aug. 14, 1997, 11 pp.
Website: The NASDAQ Market, Inc. ("NASDAQ") Consolidated subscriber Agreement, Homepage: www.pcquote.com/exchange/ex_nasd.html, download date: Aug. 15, 1997, 5 pp.
Website: "What is NASDAQ?" Homepage: http://home/axford.com/corfin/cof11.htm, download date: Aug. 15, 1997, 3 pp.
Website: "Onsale ® Auction Supersite (TM)," OnSale, Inc., Homepage: www.onsale.com/category, download date: Sep. 8, 1997, 15 pp.
Website: "About IAO (Interactive Auction Online)," Interactive Auction Online, Homepage: www.iaoauction.com/auction.htm, download date: Sep. 18, 1997, 10 pp.
Hoeschen, Brad. "Brookfield Square Hopes Mall Card Strikes a Chord," Business Journal-Milwaukee, vol. 14, No. 50, p. 19, Sep. 12, 1997, 2 pp.
Website: "NCR 7452 Workstation," NCR Corporation, Homepage: www.ncr.com/products/catalog/7452.shtml, download date: Sep. 23, 1997, 3 pp.
Website: "Case-In-Point: Bloomingdale's Inc.," Acxiom, Conway, AR., Homepage: www.acxiom.com/cip-cs-b.htm, download date: Sep. 23, 1997, 3 pp.

Website: "New Partners, More Exciting Rewards: The Membership Rewards Program for 1998," American Express Company, Homepage:, download date: Mar. 12, 1998, 38 pp.
Brochure: "MyPoints (R)", MotivationNet, Inc. (TM), Homepage: www.mypoints.com, Copyright: Apr. 1998, 24 pp.
Hemsley, Steve. "Research and Destroy; Point-of Purchase Research Provides Brand Managers with Essential Information About Customers Trends and Enables Them to Achieve the Maximum Impact From Their Displays," Apr. 16, 1998, 3 pp.
"Acme Markets, U.S. Bancorp Debut Visa Rewards Card," Card News, Jun. 22, 1998, 1 pg.
Rubinstein, Ed. "Prepaid Program Lets Galleria Guests Dine' A La Card'," Nation's Restaurant News, p. 43, Jun. 29, 1998, 1 pg.
"Datacard Partners with CSI to Offer Card-Based Loyalty Solution to Merchants", Business Wire, Jul. 9, 1998, 1 pg.
Albright, Mark. "Grocery Savings Via Web Coupons," St. Petersburg Times, Business section, p. 1E, Jul. 22, 1998, 2 pp.
"Sotheby's General Information," downloaded from http://www.sothebys.com, (1996), 2 pp.
Nimmer, Raymond T., "Electronic Contracting: Legal issues," 14 J. Marshall Computer & Infor. L. 211, Winter 1996, 25 pp.
American Law Institute, Draft-Uniform Commercial Code Article 2 (Sales), parts 2,3, and 7, Jan. 4, 1996, 24 pp.
"Cathay Pacific Online Ticket Bidding," World Internet News Digest, May 8, 1996, 1 pg.
Website: "About Rate Hunter," downloaded from http//www.207.49.64.77/rhprodrh.htm, on Jul. 14, 1996, 2 pp.
Website: "Phonemiser," downloaded from http://www.phonemiser.com/faq/htm, on Jul. 14,1996, 8 pp.
Nishimoto, Lisa, "Market Analysis: Travel Services are First Online Commerce Offerings to Fly: Many Corporations Arrange Flight, Car Rental and Hotel Bookings on the Internet," InfoWorld, Jul. 29, 1996, 2 pp.
Website: "Cathy Pacific: Cybertraveler auction #3—Official Rules," downloaded from http://www.cathypacific, downloaded Jul. 30, 1996, 4 pp.
Website: American Airlines Internet Silent Auction, American Airlines, Inc, downloaded from http://www.Americanair.com, Aug. 1996, 8 pp.
Website: "Crest: Cruise/Ferry Revenue Management System," Revenue Technology services Corporation, downloaded from http://www.rtscorp.com/h2o.htm, Aug. 5, 1996, 5 pp.
"World's First Real-Time Travel Auction Service to be Available Via World Wide Web," Business Wire, Nov. 4, 1996, 2 pp.
Website: "Web Ventures Presents Bookit!," downloaded from http://www.webventure.com/bookit/, Dec. 2, 1996, 1 pg.
"UK's World Telecom Unveils New Worldsaver Tariffs," Newsbytes, Feb. 13, 1997, 1 pg.
Website: "Frequently Asked Questions About: Airhitch," downloaded from http://www.isicom.fr/airhitch/ahfaq, May 6, 1997, 5 pp.
Website: Airhitch Your way to Low Cost Travel, downloaded from http://www.vaportrails.com/Budget/Budfeatures/Airhitch/Airhitch.html, May 6, 1997, 2 pp.
Website: Hitch a Flight to Europe, downloaded from http://www.travelassist.com/mag/a69.html, Jan. 18, 1997, 1 pg.
Website: "Trade-Direct: We Help You Trade with Confidence," downloaded from http://www.trade-direct.com/, Aug. 6, 1997, 2 pp.
Opensite Technologies, Inc., Brochure copyright date 1998, 8 pp.
Website: "CSM Online: Collector's Super CSM Mall," downloaded from http://www.csmonline.com/help/aboutcsm.html Apr. 23, 1998, 4 pp.
Website: "Netis: Auction Web," downloaded from http://www.auctionweb.com Oct. 13, 1998, 9 pp.
Website: "DealDeal>com:Bid to Win," downloaded from http://dealdeal.com/pxcfm/bidandwin.cfm?classID=e1c&cid=&cal, Oct. 29, 1998, 2 pp.
Mandese, Joe, "Interactive Puts Radio at Crossroads; Out-of Home Role, Tapping into Digital Tech Could Ensure Future," Advertising Age, News, Oct. 25, 1993 at p. 12, 4 pp.
Ellis, Stephen, "Credit Card firms Drive Down Costs," Sunday Times Features section, Feb. 27, 1994, 4 pp.
Ratcliffe, Mitch, "Lucie; Interactive Environment," Information, Advertising stands Upright, Prepares to Walk; Information Presentation Technologies Inc.'s Local Use consumer Interactive Environment, Digital Media, Jun. 8, 1994, 4 pp.

Armstrong, Larry. "Coupon Clippers, save Your Scissors," Vons Supermarkets are Revolutionizing the Delivery of Discounts. Business week, Jun. 20, 1994, 2 pp.

Bowles, Bob and Andreasen, Lois, "ADSI: Maximizing the Synergy Between the Network and Terminals; Analog display Services Interface," Telephony, Aug. 19, 1994, vol. 227, No. 9 at p. 20, 4 pp.

Ratcliffe, Mitch. "All Roads Lead to Microsoft's Windows Everywhere Strategy," Digital Media, Mar. 6, 1995, 11 pp.

Various Communications-Related Articles in Communications Daily, May 15, 1996, vol. 16, No. 95 3 pp.

Nolle, Tom, "Overcoming Cellular Déjà vu; Personal Communications Services," America's Network, Sep. 15, 1996, 6 pp.

Meese, Mickey. "Mastercard, Retailers Testing Point of Sales Discounts Program"; Credit/Debit/ATMS, Sep. 24, 1996, 1 pg.

Battle of the Bogoff: Roderick Oram on a Clash between Retailers and Manufacturers, Financial times (London), Management, Marketing and Advertising, Oct. 24, 1996 at p. 14, 2 pp.

"AT&T Wireless Adds Convenience to Buying Cellular services," M2 Communications Ltd. 1996; M2 Presswire, Pittsburgh, Nov. 20, 1996, 2 pp.

Beyer, Leslie. Target Marketing Made Easy; Supermarkets, Delta Communications Inc., Grocery Marketing, Feb., 1997, 3 pp.

"Emaginet Plans to Push Its Way into Consumer Mindset Pocketbook," Interactive PR and Marketing News, May 30, 1997, vol. 4 No. 22, 2 pp.

Warner, Bernhard. "Ads in the Ether on PC's Phones, Pagers (Will Consumers Accept Promo Beeps?)," Brandweek, Mar. 31, 1997 at p. 48, 3 pp.

Sinclair, Stewart. "To Mail or Not to Mail?" Strategy, Strategy Directresponse Special Report, Couponing, Oct. 12, 1998 at p. D21, 4 pp.

Dennis, Sylvia, "Visa Gets ready for Interactive Set-Top Boxes," Newsbytes, Dec. 14, 1998, 2 pp.

Shermach, Kelly. "Retailers Rebuild Roots As Loyalty Pioneers," Card Marketing, Jan. 1999, vol. 3, No. 1, 2 pp.

"Northwest Airlines, Sprint Enter into Mileage Partnership; Consumers can Earn Up to 16,500 Frequent Flyer Miles Through Wide Range of Communications Services—Long Distance, Internet, Paging and Ultimately Sprint PCS," PR Newswire, Financial News, Jan. 5, 1999, 2 pp.

Free from NextCard—The Ages of Myst(TM), NextCard Promotion. (http://www.nextcard.com/ages/agesofmyst.html), download date: Jan. 6, 1999, 2 pp.

"E-Card web Page," E-Commerce Services from First USA, (http://apl.firstusa.com/pcard/indexl.cfm?), download date: Jan. 11, 1999, 5 pp.

"About SaveSmart," SaveSmart.com, (http://www.savesmart.com/about/savesmart.html), down date: Jan. 12, 1999, 4 pp.

Internet/News.com staff, "The Trip.com, Visa Launch Rewards Program," (http://www.internetnews.com/ec-news/1999/01/1302-trip.html), download date: Jan. 13, 1999, 2 pp.

"MySimon," my-Simon.com fact Sheet, (http://www.mysimon.com/corporate/company/factsheet.html), download date Jan. 13, 1999, 3 pp.

About ClickRewards the Best way to Earn Miles, (http://www.clickrewards.com/about.html), download date: Jan. 13, 1999, 3 pp.

"Join AOL Long Distance and This Is What You Will Receive . . .," Jan. 13, 1999, 2 pp.

"FYI; Calls Are Free After the Ads," Star Tribune, Jan. 14, 1999, 1 pg.

"The New AE Card," American Eagle Outfitters Credit Application, Jan. 14, 1999, 6 pp.

"Alta Vista's special Offer to You . . . $10 for Any CD!," Jan. 17, 1999, 1 pg.

"Amazia Endeavour Travel," TS60 Eight Day Fly Drive Package, Jan. 17, 1999, 2 pp.

"Rent from NetFlix.com Buy from Amazon.com," Official Press Release, Jan. 17, 1999, 1 pg.

"Sprint Sense Anytime;" Titanic on Videocassette is free when you sign up for Sprint Sense Day Long Distance, (http://csg.sprint.com/titanic), download date: Jan. 18, 1999, 1 pg.

O'Brien, Timothy L., "The Market: Market Place—Taking the Danger out of Danger out of Risk; Chase says Models Helped it avoid Financial Minefields," The New York Times Business/Financial Desk, Jan. 20, 1999, 4 pp.

Cox, Beth, "Visa, Travelweb Enter Online Marketing Partnership," Internetnews.com, Jan. 21, 1999, 1 pg.

Ellin, Abby, "Listening to an Earful for Savings," (Hear the Pitches and talk for Free), The New York Times, Jan. 24, 1999, 1 pg.

"Kiosk Issues Cards for Loyalty and Credit: Datacard, Minneapolis, Has Introduced a Line of Kiosks that Retailers Can Use to Issue Loyalty Program Cards and In-Store Charge Cards," Rtnews Feb. 1999, 1 pg.

Files, Jennifer, "Grocers, AT&T Team Up; "Smart" Coupon to Offer Bonus," The Dallas Morning News, Business, Feb. 6, 1999, 2 pp.

Wijnen, Renee, "Listening to Ads Earns Free Long Distance; Advertisers Select Target Groups to Hear Messages," DM News, Supplement, Teleservices News, Mar. 1, 1999, 3 pp.

"Smart Cards; Buying Via Cable Lines," Future Banker, Future Money, Mar. 1, 1999, 1 pg.

"CardTrak Online," ATM Ads, (www.cardweb.com/csrdtrak/news/1999/march/4a.html), 1 pg.

"Wells Fargo ATMs in California Becomes Little Billboards," Marketing news TM, Mar. 29, 1999, 1 pg.

"Planet U; Making Promotional Offers Available to U," (http://www.planetu/Pages/con-index.html), download date: May 23, 1999, 1 pg.

"Five Great reasons to Enroll," (http://www.coolsavings.com/scripts/why enroll.asp?. . .), download date: May 23, 1999, 2 pp.

"E-Centives," (http://www.emaginet.com/de. . .memfaq.shtml), download date: May 23, 1999, 3 pp.

Visa—Smart Cards—About Smart cards; "What Is a smart card?," (http://www.visa.com/nt/chip/info.html), Download date: May 23, 1999, 4 pp.

"Smart Cards for Windows;" The Smart Market Opportunity, (http://www.microsoft.com/windowsce/smartcard/start/background.asp), download date: May 23, 1999, 6 pp.

"Our Cards:Smart Cards:' Using Smart Cards to deliver New Value." (http://www.mastercard/com/ourcard/smartcard/articles/artivle4.html0, download date: May 23, 1999, 5 pp.

"deja.com," (http://x24.deja. . ./getdoc.xp?. . .), May 24, 1999, 7 pp.

Royal Bank is First to Offer Instant Discount Program on No-Frills, Low rate Option and Classic Visa Cards: Canada News Wire; Financial News, Jul. 2, 1999, 2 pp.

Higginbotham, Stacey, "Next, Online Bids Over Jail Time?," Business Week, Up front Section, Jul. 19, 1999, 1 pg.

Armstrong, Larry, "The Free-PC Game: Lure 'Em in and Lock 'Em Up," Business Week, Information Technology, Jul. 19, 1999, 1 pg.

Poletti, Therese, "Latest twist on Free PC's—Free iMacs:" Yahoo! News, technology Headlines; Aug. 3, 1999, 2 pp.

Hamilton, Doug, "Florida Museum Displays Massive JFK Collection, Going Places; News, Notes & Tips," The Atlanta Journal and Constitution, Nov. 7, 1999, 3 pp.

"Multi-Pint Computing Solutions," (http://multi-point.com/au/pmc/htm), download date: Nov. 22, 1999, 2 pp.

"#1 Online Department Store Joins Clickrewards in Time for the Holidays; Azazz.com to Supply Name-Brand Merchandise for Netcentives' Clickrewards Catalog and Clickrewards; Members can Now Earn Generous Clickmiles Promotions within the Azazz.com Internet Department Store," Nov. 27, 1998, 3 pp.

Miriam Kreinin Souccar. "Epidemic of Rate Shopping Spurs a Search for remedies," Jan. 7, 1999, Copyright 1999 American Banker, Inc., (http://web.lexis.nexis.com/1n.universe/s. . .a3&_md5=2d3eab8386c438f589062c3d5a7847aa), 2 pp.

"Introducing the Digital MenuBoard", Siren Technologies, Inc., (www sirentech com), undated, 4 pp.

"Cape Town", Reuters, Nov. 8, 1979, 1 pg.

"Save the Mark", Financial Times London, Feb. 1, 1983, Section: Section I, Men & Matters, p. 12, 1 pg.

Cook, Louise, "ConsumerWatch: Clip, Snip, Save", Associated Press, Mar. 12, 1984, Section: Business News, 2 pp.

Greene, Jan, "Farm bills please assn; National Grocers Association", Supermarket News, Dec. 23, 1985, Section: vol. 35, p. 6, ISSN: 0039-5803, 1 pg.

Website: "buy.com", (wysiwyg//29http//www buy com/retail/w. Category=CELLULAR&Keyword=cellular+), copyright 1997-2003, 2 pp.

Press Release of Aug. 21, 1996, "Fort Worth Outlet Square Offers American Airlines AAdvantage Miles", Tandy Corporation, Copyright 1995, 2 pp.

Press Release of Oct. 16, 1996, "Radioshack Introduces Handheld Flip-style Cellular Telephone with Vibration Alert" Tandy Corporation, Copyright 1995, 2 pp.

Pogoda, Dianne M., "G.E.C.C. Offers Credit Card with Discounts, Rebates; General Electric Capital Corp." WWD (Woman's Wear Daily) Sep. 3, 1992, 2 pp.

"Chemical Bank and AT&T Smart Cards form Strategic Alliance", www.att.com/press/1193/931117.blb.html, 3 pp.

Kristof, Kathy "Card Sharks are in Season; be Wary of Discounts and Rebates as You Shop Around for Good Credit Deals", Chicago Tribune, Nov. 23, 1993, 2 pp.

Rosenberg, Joyce M. "GE Capital Comes to Macy's aid Again", AP Worldstream Feb. 17, 1994, 2 pp.

Booker, Ellis, "Checkout Lines to Offer More Than Just Candy and Waiting", Computerworld, PC's & Workstations, May 21, 1990, 1 pg.

Shaw, Robert, "How the Smart Card is Changing Retailing", Long Range Planning, 1991, 4 pp.

"Checkstands Boost Supermarket Profits", Chain Store Age Executive, Checkstand Design and Productivity, Dec. 1991 at p. 158, 2 pp.

"Set-top 'Converger'; Interactive Initiatives Abound at NCTA Convention", Communications Daily, Jun. 10, 1993, 1 pg.

"POS spectrum: a lottery looks to POS for growth", POS News, Jan. 1989, Section: vol. 5, No. 7, p. 8, 1 pg.

"Let's Play the Cash Register Receipts Lottery", The New York Times, Dec. 25, 1990, Section: Section 1, p. 30, Col. 4, Editorial Desk, 1 pg.

Del Rosso, Laura, "Marketel says it plans to launch air fare 'auction' in June; Marketel International", Travel Weekly, Apr. 29, 1991, 3 pp.

"Philips offers customers financing through Citicorp; Philips Medical Systems North America, Citicorp North America Inc." Health Industry Today, Jun. 1991, 1 pg.

"Coupons get serious; supermarkets use barcodes to prevent misredemptions", Chain Store Age Executive with Shopping Center Age, Oct. 1992, 2 pp.

"Winn-Dixie/The Salvation Army Report Contributions For War Against Hunger", PR Newswire, Jun. 10, 1993, Section: Financial News, 1 pg.

Jones, Jeanne, "Data Readers Streamline Management . . . ", The Houston Post, Jun. 26, 1994, Section: Business, 1 pg.

Fiorini, Phillip, "No Place For Penny?", USA Today, Jul. 29, 1994, Section: News, p. 1A, 3 pp.

Smith, Alison, "Survey of UK Consumer Credit and Asset Finance", Financial Times, Nov. 3, 1994, p. VI, 3 pp.

Andreoli, Tom et al., "Cash Machines Offer A Whole Lotto Money . . . ", Crain's Chicago Business, Jun. 19, 1995, 2 pp.

Linnen, Herb et al., "AT&T Comments on new FCC rules to curb "slamming"", Jun. 14, 1995, 4 pp.

Hadley, Kimberly, "Pastors praying anti-arson effort will burn bias", The Nashville Banner, Jul. 26, 1996, Section: News, p. A13, 1 pg.

Knippenberg, Jim, "Will local radio empires strike back?", The Cincinnati Enquirer, Jul. 23, 1995, Section: Tempo, p. F01, 1 pg.

Gapper, John, "NatWest reports rise in bad debt", Financial Times, Jul. 31, 1996, Section: News, UK, 1 pg.

"Lynx Technology: Lynx to provide business leasing program through Schroder Leasing", M2 Presswire, Aug. 9, 1996, 2 pp.

Taylor, Paul, "Towards a dream market", Financial Times, Sep. 4, 1996, 2 pp.

Bonnici, Joseph et al., "Consumer issues in coupon usage: An exploratory analysis", Journal of Applied Business Research, winter 1996/1997, 11 pp.

"Happy Anniversary, here's your Cashback Bonus ® Award", Private Issue by Discover, Copyright 1997, Greenwood Trust Company, 3 pp.

"Rehayem, Gilbert, Opinion: X-Press Betting", La Fleur's Lottery World, Feb. 7, 1997, 1 pg.

Singletary, Michelle, "Electronic World, Unchecked Problem?", The Washington Post, Mar. 4, 1997, 4 pp.

"Products and Services, Checkout Direct", Catalina Marketing Corporation, (http //catalinamktg com/prodcdir htm), download date: May 29, 1997, 16 pp.

Riordan, Teresa, "Patents; A novel approach to making a better spermicide harks back to some old-fashioned methods.", The New York Times, Jun. 9, 1997, Section D, p. 2, col. 1, Business/Financial Desk, 3 pp.

Nairn, Geoff, "The key to your identity: Falling costs will allow fingerprint verification to be widely used", Financial Times (London), Jul. 15, 1997, Section: Technology, p. 12, 3 pp.

"Switch your Chase MasterCard to a Shell MasterCard from Chase and you'll earn: Free Formula Shell Gasoline", Chase Manhattan Bank USA, N.A., Sep. 1997, 2 pp.

Ross, Chuck et al., "Coke Card promotion set for '98", (http //adage com/news_and_features/features/19971117/article3 html), Copyright Nov. 1997, 2 pp.

"NCR 7453 PC-Based Point-of-Sale Solution", NCR Corporation, Copyright 1998, 2 pp.

"For the Crew & the Customer", Olivetti, Winter, 1998, 2 pp.

Krauss, Jeffrey, "Subsidized TV sets?", CED (Communications Engineering & Design), Feb. 1998, 3 pp.

Goldblatt, Henry, "AT&T Finally Has An Operator . . . ", Fortune, Feb. 16, 1998, Section: Features/Telcos, p. 79, 4 pp.

Elstrom, Peter, "Reach Out and Pay Someone", Business Week, Mar. 23, 1998, 1 pg.

"Cross-Sell Billing Statement Acquisition System", Apr. 7-9, 1998, 2 pp.

La Rossa, James L., "Ameritech policy stirs debate; executives weigh retailer rebates on eve of Cellular Telecommunications Industry Association Show; American Information Technologies Corp; Special CTIA Show Issue", HFD-The Weekly Home Furnishings Newspaper, Feb. 10, 1992, 3 pp.

Ziegler, Bart, "Sprint to Merge with Centel", Associated Press, May 28, 1992, Section: Business News, 3 pp.

Marek, Sue, "The carrier/retailer love affair—still going strong? Cellular radio industry; Cover Story", Cellular Marketing, Jul. 1992, Section: vol. 7, No. 7, p. 18, ISSN: 0890-2402, 5 pp.

"Resale Effect Debate; GAO Faults FCC on Cellular Duopoly Scheme", Communications Daily, Jul. 2, 1992, Section: vol. 12, No. 128, p. 3, 2 pp.

Strandjord, Jeannine M., "Should you bundle 401k services? Employee Benefits", Financial Executive, Sep. 1992, Section: vol. 8, No. 5, p. 45, ISSN: 0895-4186, 5 pp.

Brown, Bob and Wallace, Bob, "AT&T bid for McCaw to reshape landscape; Gives dominant carrier access to rapidly evolving market and opportunity to influence, drive, change.", Network World, Nov. 9, 1992, Section: Top News, p. 1, 3 pp.

Avril, Tom, "Centel Confident of Victory After Vote on Sprint Merger", Dec. 2, 1992, Section: Business News, 3 pp.

Avril, Tom, "Communications; Centel Investors Vote on Sprint Merger", The Commercial Appeal, Dec. 3, 1992, Section: Business, p. B4, 2 pp.

Oloroso Jr., Arsenio, "Centel holds its breath; Shareholders wait to see outcome of Sprint deal", Crain's Chicago Business, Dec. 7, 1992, Section: p. 38, 2 pp.

Yates, Ronald E., "Sprint-Centel merger complete despite fears", Chicago Tribune, Mar. 10, 1993, Section: Business, p. 1, Zone N, 3 pp.

Wenske, Paul, "Sprint's big deal", Ingram's, May 1993, Sec.: vol. 19, No. 5, Section, p. 34, 8 pp.

"Petition Criticized; Fight on CPE Unbundling for IXC Resellers Launched by Major Retailers", Communications Daily, Aug. 10, 1993, Section: vol. 13, No. 153, p. 1, 2 pp.

DeFebo, Carl Jr., "Sprint opens first superstore in Mechanicsburg", Central Penn Business Journal, Nov. 3, 1993, Section: vol. 9, No. 22, Section 1, p. 12, 3 pp.

"Testimony Feb. 8, 1994, John V. Roach Consumer Electronics Retailers Coalition House Energy/Telecommunications and Finance Antitrust Reform Act of 1993", Federal Document Clearing House Congressional Testimony, Feb. 8, 1994, 8 pp.

"Sprint—Company Data", Securities and Exchange Commission Form 10-Q, for the quarterly period ended Mar. 31, 1994, 4 pp.

"Form 10-K Sprint Corp—FON", Filed Mar. 15, 1994 (period Dec. 31, 1993), 8 pp.

Kraemer, Joseph S., "Local competition; Changing Ground Rules for Network Access", Business Communications Review, Sep. 1994, Sec.: vol. 24, No. 9, p. S4, ISSN: 0162-3885, 10 pp.

Steward, Shawn, "Activating the masses", Cellular Business, Oct. 1994, Section: vol. 11, No. 10, 6 pp.

"Sprint—Defining the Communications Company of the Future 1994 Annual Report to Shareholders", Document Date: Dec. 31, 1994, Filing Date: Mar. 22, 1995, 36 pp.

"Inside Sprint Corporation: 1994 Competitive Market Developments", Inside Telecom, Jul. 17, 1995, 7 pp.

"Tandy Corp—Form-Type ARS", Document Date: Dec. 31, 1995, Filing Date: Apr. 10, 1996, 14 pp.

"Sprint Completes Spin-Off Of Its Cellular Subsidiary", Chicago Sun-Times, Mar. 8, 1996, Section: Financial, p. 44, 2 pp.

"Securities and Exchange Commission Form 10-K/A, 360 Degrees Communications Co Cross-Reference: Sprint Cellular Co", For the fiscal year ended Dec. 31, 1995, Filing date: Apr. 16, 1996, 22 pp.

Press Release: "Sprint, Sprint Spectrum and Radio Shack Join Forces", New York, NY, Sep. 11, 1996, 5 pp.

Maxon, Terry, "Tandy pairs with Sprint for venture; Companies will offer expanded offering of telecommunications products, services", The Dallas Morning News, Sep. 12, 1996, Section: Business; pp. 1B, 2 pp.

"Tandy, Sprint to offer one-stop phone shopping", downloaded from http://web.archive.org/web/19971022163159/www.tandy.com/press/sprinton, copyright Tandy. Corporation, 1995, 2 pp.

"Tandy Corporation—Quarterly Report", For the quarterly period ended Sep. 30, 1996, Filed Nov. 12, 1996, 36 pp.

Website: "Sprint 1995 Annual Report—Notes to Consolidated Financial Statements", (http //www sprint com/sprint/annual/95/finance/p_52a html), download date Oct. 21, 2003, 1 pg.

Schrage, Michael "Free Stuff! Predatory Pricing or Creative Cross-Promotion? You be the Judge; The Beta Version; Industry Trend or Event" Marketing Computers, Oct. 1995, 2 pp.

Marshall, Kyle "More Phone Choices Ring In", The News and Observer Aug. 13, 1996, 2 pp.

Wessel, Harry "Rewarding Experience?; Credit Cards Offering Bonuses Not For Everyone", Chicago Poet-Gazette, Nov. 4, 1996, 3 pp.

Selasky, Susan "Easy-To-Swallow Savings; Diner Credit Cards Serve Wide menu of Discounts", Pittsburgh Post-Gazette Dec. 5, 1996, 3 pp.

"Merger Creates Alliance Data", Credit Risk Management Report Dec. 16, 1996, 1 pg.

Higgins, Stephen "Digital Phone Service on the Way" Business Dateline; New Haven Register, Jan. 7, 1997, 3 pp.

Kerstetter, Jim "E-Commerce Updates Get Intelligent Agents; Electronic Commerce", PC Week Feb. 3, 1997, 2 pp.

Barlow, Rick "Relationship Marketing: Coalition Marketing is Coming Back", Brandweek Apr. 28, 1997, 2 pp.

Simon, Ruth "Make Sure Your Rebate Card Still Delivers the Goods", Money Aug. 1997, 2 pp.

Gilligan, Gregory J. "Credit Cards from Retail Store's a Mixed Blessing for Shoppers", The Richmond Times Dispatch, Jul. 20, 1997, 4 pp.

Fitzgerald, Beth "New Jersey-Based SCA Helps Private Label Credit Cards Take Off", The Star Ledger Aug. 4, 1997, 3 pp.

Sanders, Edmund "Tricky Business; The Magic of Rebate Cards can Quickly Disappear", Chicago Tribune Aug. 18, 1997, 3 pp.

Wijnen, Renee "Cendant Eyes Cross-Marketing Opportunities; CUC Internation-HFS Inc. Merger Expected to Yield an Additional 2 Million Club Members" DM News Feb. 2, 1998, 2 pp.

"Cardholders Think Big" Bank Marketing International Mar. 1998, 3 pp.

Wald, Matthew L. "Spending It; Untying Cellular Phones From Those Annual Contracts" The New York Times Mar. 15, 1998, 2 pp.

"American Eagle Outfitters, Inc. Introduces the First Clear Credit Card" PR Newswire Mar. 26, 1998, 2 pp.

Ling, Teh Hooi "Prices of Handphones Dive, Thanks to Cross-Subsidies" Business Times Apr. 8, 1998, 2 pp.

"Card Briefs: Beneficial, Casual Male Team Up on Card" The American Banker May 4, 1998 1 pg.

"Points Earn Little Credit as Cardholders Fail to Cash In" Birmingham Post May 9, 1998, 2 pp.

"Jay Jacobs Inc. Introduces Private Label Credit Card", Business Wire May 18, 1998, 1 pg.

"Wellsparks Group Launches V.I.P. Rewards; The Most Comprehensive Relationship Marketing Program Ever Created by a Mall Developer", Business Wire, May 19, 1998, 2 pp.

"SNET Cellular Value Plans" Brochure, Jun. 12, 1998, 3 pp.

"Shoppers Charge Accounts Co. to Administer Private Label Credit Card for Lew Magram Ltd; Program Marks SCA,s Entry into Retail Catalog/Mail Order Industry" PR Newswire Jun. 29, 1998, 2 pp.

"Cell Phones at 7-11? Almost Everyone is Selling Wireless Service these Days. Here's How to Get the Right Deal" Time Magazine Jul. 6, 1998, 2 pp.

"The Savings Game: Read Fine Print in Rebate Offers by Credit Cards" The Cincinnati Enquirer Aug. 31, 1998, 3 pp.

"Wal-Mart on Retail Road Less Traveled: Cobranding," The American Banker Sep. 11, 1998, 3 pp.

Elkin, Tobi "Promotions: Mastercard Wins Coveted On-Pack Real Estate in Tie-in with Microsoft" Brandweek Sep. 14, 1998, 1 pg.

"Clubmacy's" Brochure Sep. 1998, 2 pp.

"Filene's" Credit Card Application, Sep. 1998, 2 pp.

"Dual-Function Cards Latest pitch to Call in Holders" Card Marketing, Nov. 1998, 2 pp.

"Issuers Charge Ahead to Focus on Price vs. Brand", Card Marketing, Nov. 1998, 2 pp.

"Competition: First USA, with its Microsoft Pact, is King of the Internet", Credit Card News Nov. 1, 1998, 2 pp.

"Retail Cards: Attention Kmart Card Holders: 6% Back is Dead a New package of Perks is Coming" Credit Card News Nov. 1, 1998, 3 pp.

"Microsoft and First USA Announces $90 Million Online Advertising Alliance" EDP Weekly's IT Monitor Nov. 2, 1998, 2 pp.

Feldman, Amy "Paying with Plastic Not Such a Smart Idea", New York Daily News Nov. 4, 1998, 2 pp.

Cowell, Alan "America's Turn to Colonize; CreditCard Issuers Invade Britain, with U.S. Firepower", The New York Times Nov. 12, 1998, 5 pp.

Shermach, Kelly "Partnerships Help Issuers Web Concepts", Card Marketing, Dec. 1998, 2 pp.

"Largest Internet Ad Deal Signed", Bank Marketing International, Dec. 1998, 3 pp.

"Amazon.com and Netflix.com Establish Promotional Relationship for the Sale and Rental of DVD Titles" Business Wire Dec. 4, 1998, 3 pp.

"At Sports Superstore Online, Shoppers Get More for Their Money; 10,000 Reasons to Shop at Sports Superstore Online", Business Wire Dec. 4, 1998, 2 pp.

"Credit Card Enticements" NPR Morning Edition, Dec. 23, 1998, 3 pp.

"Pagers That Can Spell It All Out", Business Week Jan. 16, 1995, 2 pp.

Block, Valerie "GM Turns Up the Heat with Plan to Cross-sell some Financial Products," The American Banker Nov. 18, 1994, 2 pp.

Notice of Allowance for U.S. Appl. No. 11/832,943 dated Feb. 17, 2011, 10 pp.

US 5,709,782, 01/1998, Larson et al. (withdrawn)

* cited by examiner

| ITEM IDENTIFIER 420 | ITEM DESCRIPTION 422 | PRICE 424 |
|---|---|---|
| 12340 | NEWS MAGAZINE | $3.50 |
| 12341 | BABY FORMULA (17 OZ.) | $6.75 |
| 12342 | BRAND X COLA | $2.29 |

FIG. 4

| MERCHANT IDENTIFIER 520 | MERCHANT NAME 522 | MERCHANT ACCOUNT IDENTIFIER 524 | AMOUNT OWED 526 |
|---|---|---|---|
| M 001 | MERCHANT X | MASTERCARD 2222-2222-2222-2222 | $114.00 |
| M 002 | MERCHANT Y | BANK & TRUST ACCOUNT NO. 1234567891 | $0.00 |
| M 003 | MERCHANT Z | INTERNAL ACCOUNT NO. A 00340 | $0.00 |
| M 004 | MERCHANT Q | AMERICAN EXPRESS 3333-3333-3333-3333 | $89.95 |

| REBATE RULE IDENTIFIER 620 | ITEM IDENTIFIER 622 | REBATE AMOUNT 624 | REQUIRED SUBSCRIPTION 626 | REBATE MESSAGE 628 | CONTACT IDENTIFIER 630 |
|---|---|---|---|---|---|
| R 01 | 12340 | ITEM PRICE | NEWS MAGAZINE, AT LEAST 12 MONTH TERM | THIS ISSUE IS FREE WITH A ONE-YEAR SUBSCRIPTION TO NEWS MAGAZINE. CALL 1-800-NEWSUBS FOR YOUR SUBSCRIPTION AND REBATE | 1-800-NEWSUBS |
| R 02 | 12340 | ITEM PRICE | ANY MAGAZINE | THIS ISSUE IS FREE WITH A SUBSCRIPTION TO ANY MAGAZINE. CALL 1-800-NEWSUBS FOR YOUR SUBSCRIPTION AND REBATE | 1-800-NEWSUBS |
| R 03 | 12341 | ITEM PRICE | PARENTING MAGAZINE, ANY TERM | WE'LL REBATE THE PRICE OF YOUR BABY FORMULA IF YOU CALL 1-800 NEWSUBS AND SUBSCRIBE TO PARENTING MAGAZINE | 1-800-NEWSUBS |
| R 04 | 12341 | ITEM PRICE + $1.00 | PARENTING MAGAZINE AND ONE OTHER MAGAZINE | WE'LL PAY YOU THE PRICE OF THE BABY FORMULA PLUS ONE DOLLAR. JUST CALL 1800-NEWSUBS AND SUBSCRIBE TO PARENTING MAGAZINE AND ONE OTHER MAGAZINE | 1-800-NEWSUBS |

| CODE 720 | ISSUED? 722 | EXPIRATION DATE 724 | REDEEMED? 726 | ISSUING MERCHANT 728 | REBATE RULE IDENTIFIER 730 | REBATE AMOUNT 732 |
|---|---|---|---|---|---|---|
| ABCD1234567 | NOT ISSUED | -- | -- | M001 | -- | -- |
| 89AB32110 | ISSUED 8:15 PM 7/21/2001 | 7/28/2001 | REDEEMED 7/24/2001 11:40 AM | M001 | R 02 | $2.95 |
| 123456789 | ISSUED 3:48 PM 7/4/2001 | 8/4/2001 | REDEEMED 7/29/2001 1:18 PM | M004 | R 01 | $3.50 |
| 8363199110 | ISSUED 5:03 PM 6/24/2001 | 8/28/2001 | NOT REDEEMED | M019 | R 03 | $6.75 |

702 → (row 1), 704 → (row 2), 706 → (row 3), 708 → (row 4)

| CODE 820 | ISSUED? 822 | EXPIRATION DATE 824 | SUBSCRIPTION PURCHASED? 826 | REDEEMED? 828 | ISSUING MERCHANT 830 | REBATE RULE IDENTIFIER 832 | REBATE AMOUNT 834 |
|---|---|---|---|---|---|---|---|
| ABCD1234567 | NOT ISSUED | -- | -- | -- | M 004 | R 01 | $3.50 |
| 13579842 | ISSUED 5:41 PM 8/9/2001 | 8/23/2001 | NO | -- | M 001 | R 02 | $2.95 |
| 998877665 | ISSUED 6:03 PM 8/9/2001 | 8/30/2001 | PURCHASED 11:23 AM 8/21/2001 | NO | M 001 | R 03 | $6.75 |
| 24680246 | ISSUED 7:11 PM 8/9/2001 | 8/30/2001 | PURCHASED 9:07 AM 8/29/2001 | REDEEMED 1:01 PM 8/31/2001 | M 002 | R 04 | $7.75 |

FIG. 8

| CREDIT CARD ACCOUNT NUMBER 1111-1111-1111-1111 1002 |||
|---|---|---|
| DESCRIPTION 1020 | TRANSACTION DATE 1022 | AMOUNT 1024 |
| MERCHANT Q | 7/4/2001 | $22.89 |
| SUBSCRIPTION: NEWS MAGAZINE | 7/29/2001 | $12.95 |
| REBATE: ONE ISSUE NEWS MAGAZINE PURCHASED AT MERCHANT Q | 7/29/2001 | - $3.50 |

FIG. 10

METHOD AND APPARATUS FOR FACILITATING THE SALE OF SUBSCRIPTIONS TO PERIODICALS

The present application is a continuation of U.S. patent application Ser. No. 09/260,437, filed Mar. 2, 1999, now U.S. Pat. No. 7,162,434 entitled "METHOD AND APPARATUS FOR FACILITATING THE SALE OF SUBSCRIPTIONS TO PERIODICALS"; which application is a continuation-in-part application of U.S. patent application Ser. No. 08/841,791, entitled "METHOD AND APPARATUS FOR SELLING SUBSCRIPTIONS TO PERIODICALS IN A RETAIL ENVIRONMENT", filed on May 5, 1997; now U.S. Pat. No. 5,926,796 and a continuation-in-part of U.S. patent application Ser. No. 09/136,147, entitled "METHOD AND APPARATUS FOR ESTABLISHING A SUBSCRIPTION TO A PERIODICAL", filed on Aug. 18, 1998, now abandoned which is a continuation-in-part application of U.S. patent application Ser. No. 08/841,791, entitled "METHOD AND APPARATUS FOR SELLING SUBSCRIPTIONS TO PERIODICALS IN A RETAIL ENVIRONMENT", filed on May 5, 1997; and a continuation-in-part of U.S. patent application Ser. No. 09/166,367, entitled "METHOD AND APPARATUS FOR PROVIDING A DISCOUNT TO A CUSTOMER THAT PARTICIPATES IN TRANSACTIONS AT A PLURALITY OF MERCHANTS", filed on Oct. 5, 1998; now abandoned and a continuation-in-part of U.S. patent application Ser. No. 09/219,267, entitled "METHOD AND APPARATUS FOR FACILITATING ELECTRONIC COMMERCE THROUGH PROVIDING CROSS-BENEFITS DURING A TRANSACTION", filed on Dec. 23, 1998.

Each of the above-referenced applications is incorporated by reference herein in its entirety.

FIELD OF THE INVENTION

The present invention relates to methods and apparatus for facilitating the sale of subscriptions to periodicals.

BACKGROUND OF THE INVENTION

Each year over one billion magazine issues are sold through over 50,000 retail stores in the United States. The "cover price" (cost of an issue) at a typical retail store ("retailer") is often two or three times higher than the pro rata price of an issue provided in connection with a subscription to the periodical. Despite the higher prices, consumers are willing to purchase issues from retail stores because of convenience and timeliness.

Some consumers decide to forgo the advantages of issues purchased at retail stores in favor of subscriptions to periodicals, which are more cost effective. However, many inconveniences deter purchasers of single issues at retail stores from subscribing to the periodicals. For example, if a customer purchases a subscription, the retailer is deprived of the revenue he might have gained if the customer were to purchase the issues of the periodical. Furthermore, the customer cannot pay for a subscription with cash. The consumer must either mail a check or make a telephone call to initiate a subscription and provide a credit card number.

Retailers are burdened by the need to manage issues of periodicals. Retailers receive issues from a fulfillment house. Typically, the retailer is unable to sell approximately half of the issues, and must return them at substantial cost to the retailer. It is very difficult to predict which issues will sell and the quantities thereof. If too many issues are ordered, they must be returned. If too few issues are ordered, the retailer does not realize the profit it could have realized. Consequently, it is difficult or impossible to accurately stock the correct quantities of various issues.

It would be advantageous to provide a method and apparatus for facilitating the sale of subscriptions to periodicals.

SUMMARY OF THE INVENTION

It is an object of the present invention to provide a method and apparatus for facilitating the sale of subscriptions to periodicals.

In accordance with the present invention, a POS terminal receives a signal that indicates an item, for example, via a bar code scanner. The POS terminal ascertains whether the item is associated with an offer for a rebate. If so, a code is generated and output to the customer, such as on a printed receipt. The code is associated with an offer for a rebate in exchange for establishing a subscription to a periodical. If the customer subscribes to a required periodical, he will be credited the amount he paid for the item.

Subsequently, the customer requests a subscription to a periodical from a subscription fulfillment house, and provides his code in conjunction with the request. If the code is valid, the customer is provided with a rebate. The rebate may be provided directly by the subscription fulfillment house (e.g. a credit to a credit card account) or may be provided by a merchant (e.g. a discount on a future purchase).

BRIEF DESCRIPTION OF THE DRAWINGS

FIG. 4 is a tabular representation of an inventory database of the POS terminal of FIGS. 2A and 2B.

FIG. 5 is a tabular representation of a merchant database of the subscription fulfillment house server of FIG. 3.

FIG. 6 is a tabular representation of a rebate rule database of the subscription fulfillment house server of FIG. 3.

FIG. 7 is a tabular representation of an embodiment of a code database of the subscription fulfillment house server of FIG. 3.

FIG. 8 is a tabular representation of another embodiment of the code database of the subscription fulfillment house server of FIG. 3.

FIG. 10 is a tabular representation of charges and credits made to an exemplary credit card account.

DETAILED DESCRIPTION OF THE PREFERRED EMBODIMENTS

Applicants have recognized that a customer purchasing an issue of a periodical may be provided with an incentive to subsequently purchase a subscription. In exchange for subscribing to the periodical, the customer receives a rebate. In one embodiment, the cost of the issue is paid to the customer. The subscription fulfillment house that processes the subscription request may fund the rebate as payment for acquiring a new subscriber. In one embodiment, the subscription fulfillment house pays the customer the rebate amount directly. In another embodiment, the subscription fulfillment house arranges for a merchant to pay the customer the rebate amount. The purchase of other items besides issues of periodicals may likewise prompt an offer to the customer that provides an incentive to purchase a subscription.

Figure 1:
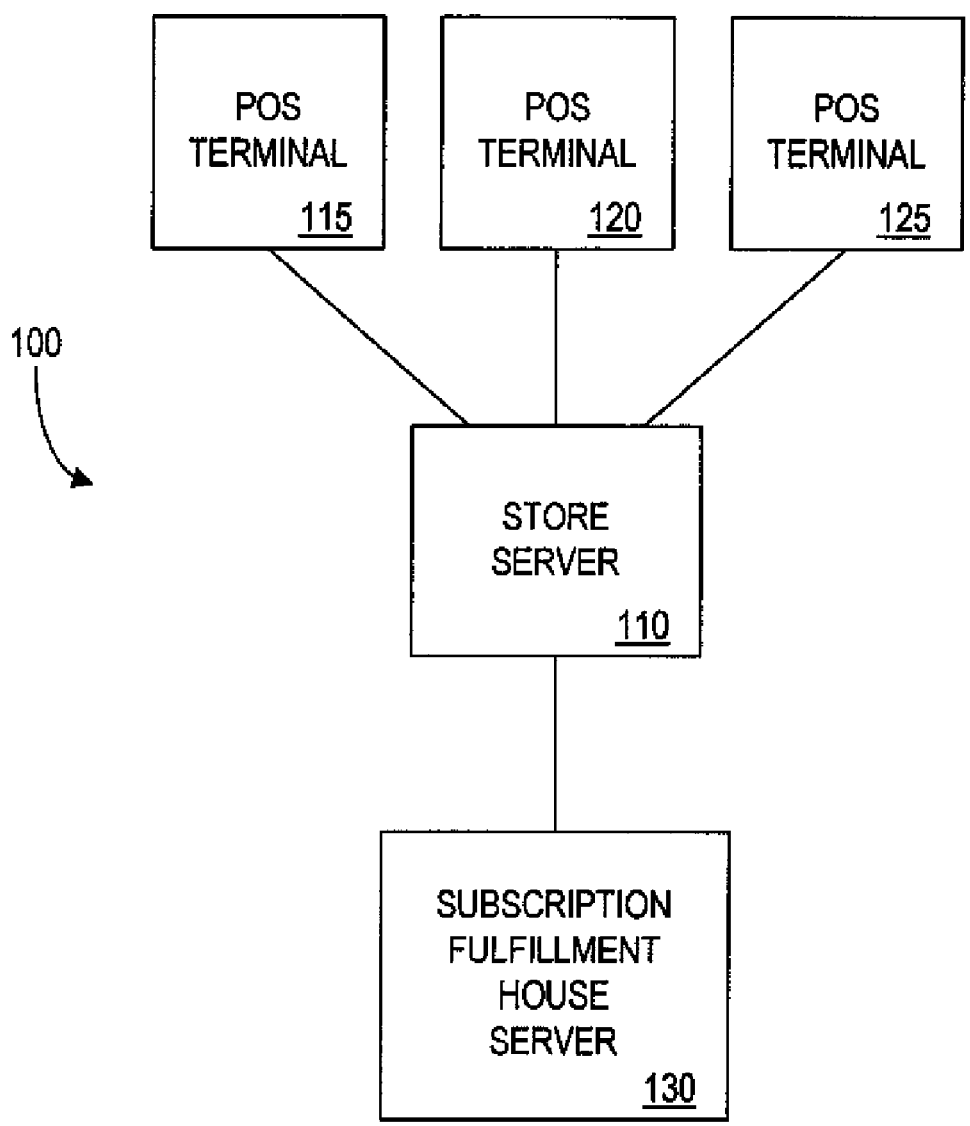
FIG. 1 is a schematic illustration of an apparatus for facilitating the sale of subscriptions to periodicals in accordance with the present invention.

Referring to FIG. 1, an apparatus 100 includes a store server 110 that is in communication with point of sale (POS) terminals 115, 120 and 125 and with a subscription fulfillment house server 130. The store server 110 may communicate with the POS terminals 115, 120 and 125 via an appropriate network such as a local area network (LAN). The POS terminals 115, 120 and 125 may be, for example, the NCR 7454 manufactured by NCR Corporation or the IBM 4683 manufactured by International Business Machines. The POS terminals 115, 120 and 125 perform such processes as calculating the total price of a purchase (goods or services) and calculating the amount of change due to a customer The POS terminals 115, 120 and 125 may furthermore track purchases made and adjust databases of inventory accordingly. Although three POS terminals are shown in FIG. 1, any number of POS terminals may be in communication with the store server 110 without departing from the spirit and scope of the present invention. Each of the POS terminals 115, 120 and 125 may be located in the same store, in different stores of a chain of stores, or in other locations.

The store server 110 directs the operation of, stores data from and transmits data to the POS terminals 115, 120 and 125. The store server 110 may itself be a POS terminal, as described herein, or may be another computing device that can communicate with one or more POS terminals. The store server 110 may perform many of the processes described below, especially those processes that are performed for more than one POS terminal. The store server 110 may furthermore store data, such as an inventory database, that is to be shared by the POS terminals 115, 120 and 125. Similarly, data described herein as stored on the store server 110 may be stored on the POS terminals 115, 120 and 125, as appropriate. There may be any number of store servers in communication with the subscription fulfillment house server 130. Each store server would typically be associated with a different merchant.

The store server 110 may communicate with the subscription fulfillment house server 130 via an appropriate network such as the Internet or a proprietary wide area network (WAN). The subscription fulfillment house server 130 may be a computing device, such as one based on the Intel® Pentium® microprocessor, that processes requests for subscriptions on behalf of the subscription fulfillment house. Possible hardware configurations for the subscription fulfillment house server 130 will be apparent to those skilled in the art.

Figure 2A:
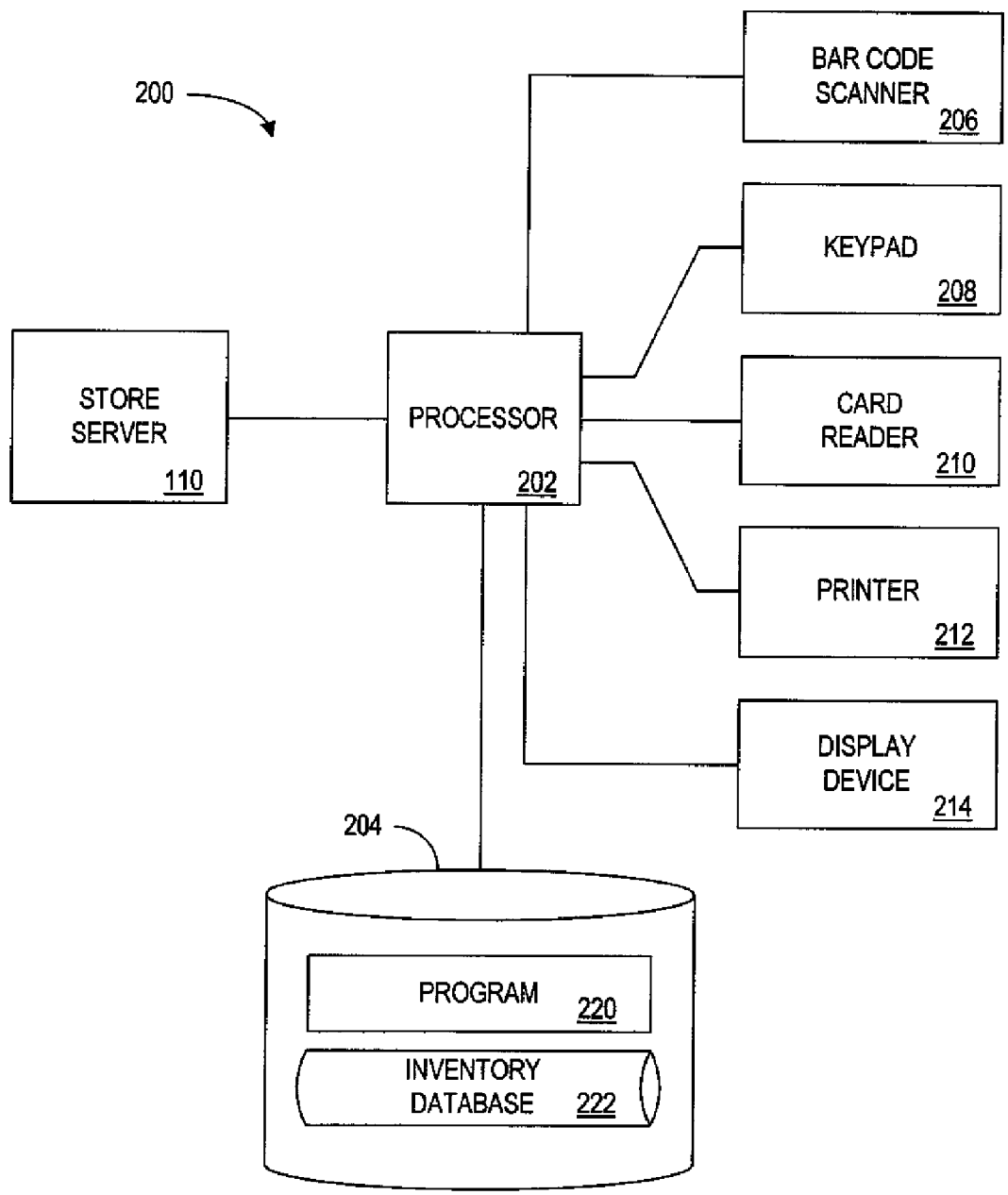
FIG. 2A is a schematic illustration of an embodiment of a POS terminal of the apparatus of FIG. 1.

FIG. 2A illustrates an embodiment of a POS terminal 200 that is descriptive of any or all of the POS terminals 115, 120 and 125 (FIG. 1). The POS terminal 200 comprises a processor 202, such as one or more Pentium®D microprocessors. The processor 202 is in communication with a data storage device 204. The data storage device 204 comprises an appropriate combination of magnetic, optical and/or semiconductor memory, and may include Random Access Memory (RAM), Read-Only Memory (ROM) and/or a hard disk. The processor 202 and the storage device 204 may each be (i) located entirely within a single computer or other computing device; (ii) connected to each other by a remote communication medium, such as a serial port cable, telephone line or radio frequency transceiver; or (iii) a combination thereof In one embodiment, the POS terminal 200 may comprise one or more computers that are connected to a remote server computer for maintaining databases.

The processor 202 may be in communication with one or more input devices. An optical bar code scanner 206 is operative to read bar codes and transmit signals indicative of those bar codes to the processor 202. As is known in the art, a bar code is a series of vertical bars of varying widths printed on consumer product packages and other retail items and used to allow a computer to identify those products. The optical bar code scanner 206, such as those manufactured by symbol technologies, is an optical device that uses a laser beam to read and interpret bar codes. A keypad 208 is operative to transmit input signals, such as signals indicative of actuated keys, to the processor 202. A card reader 210 is operative to read cards such as magnetic strip cards that have magnetizable strips or surfaces on which data may be recorded. The card reader in turn transmits signals representing such read data to the processor 202.

The processor 202 may likewise be in communication with one or more output devices. A printer 212 is operative to register indicia on paper or other material, thereby printing receipts and coupons, as controlled by the processor 202. A display device 214 comprises a video monitor or other device operative to display at least alphanumeric characters to the customer and/or cashier as directed by the processor 202.

Many types of input devices and output devices are known to those skilled in the art and need not be described in detail herein.

The data storage device 204 stores a program 220 for controlling the processor 202. The processor 202 performs instructions of the program 220 and thereby operates in accordance with the present invention, particularly in accordance with the methods described in detail herein. The program 220 furthermore includes program elements that may be necessary, such as an operating system and "device drivers", for allowing the processor 202 to interface with computer peripheral devices such as input devices and output devices. Appropriate device drivers and other necessary program elements are known to those skilled in the art and need not be described in detail herein.

The storage device 204 also stores an inventory database 222. The inventory database 222 is described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information, and those skilled in the art will understand that the number and content of the entries can be different from those illustrated herein.

Figure 2B:
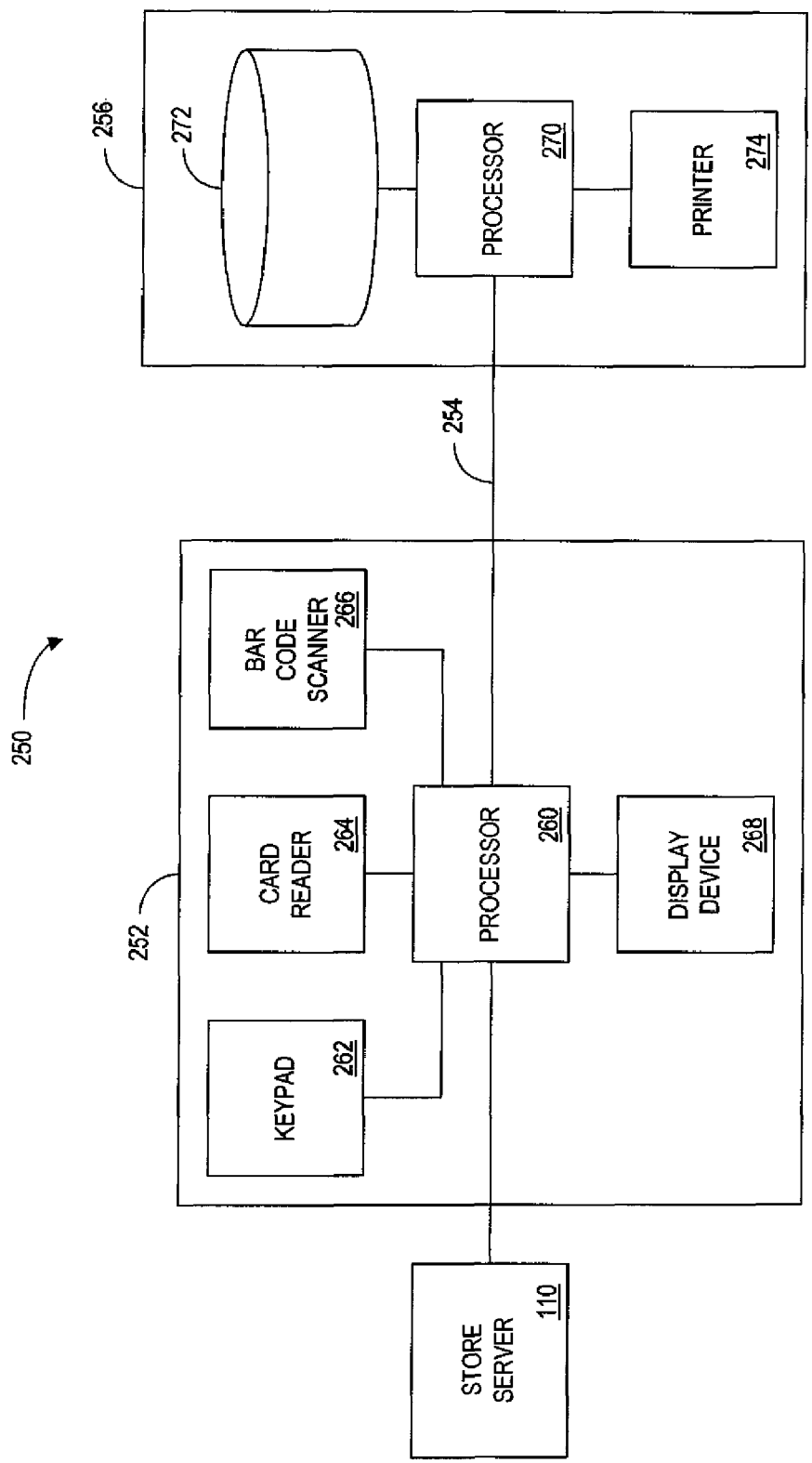
FIG. 2B is a schematic illustration of another embodiment of a POS terminal of the apparatus of FIG. 1.

FIG. 2B illustrates another embodiment of a POS terminal 250 that is descriptive of any or all of the POS terminals 115, 120 and 125 (FIG. 1). The POS terminal 250 comprises a control device 252 that is in communication via a communication medium 254 (e.g. a serial port cable) with a system 256 for printing coupons. The control device 252 comprises a processor 260 in communication with a keypad 262, a card reader 264, a bar code scanner 266 and a display device 268. The system 256 for printing coupons comprises a processor 270 in communication with a storage device 272 and a printer 274. In his embodiment the control device 252 may be a cash register, and the system 256 may be an electronic device for printing coupons in accordance with data received from the cash register. For example, the control device 252 may be IBM 4690 running IBM SUREPOS ACE software and the system 256 may be a Lexmark printer embedded with Catalina coupon software. Other configurations of POS terminals will be understood by those skilled in the art.

Figure 2C:
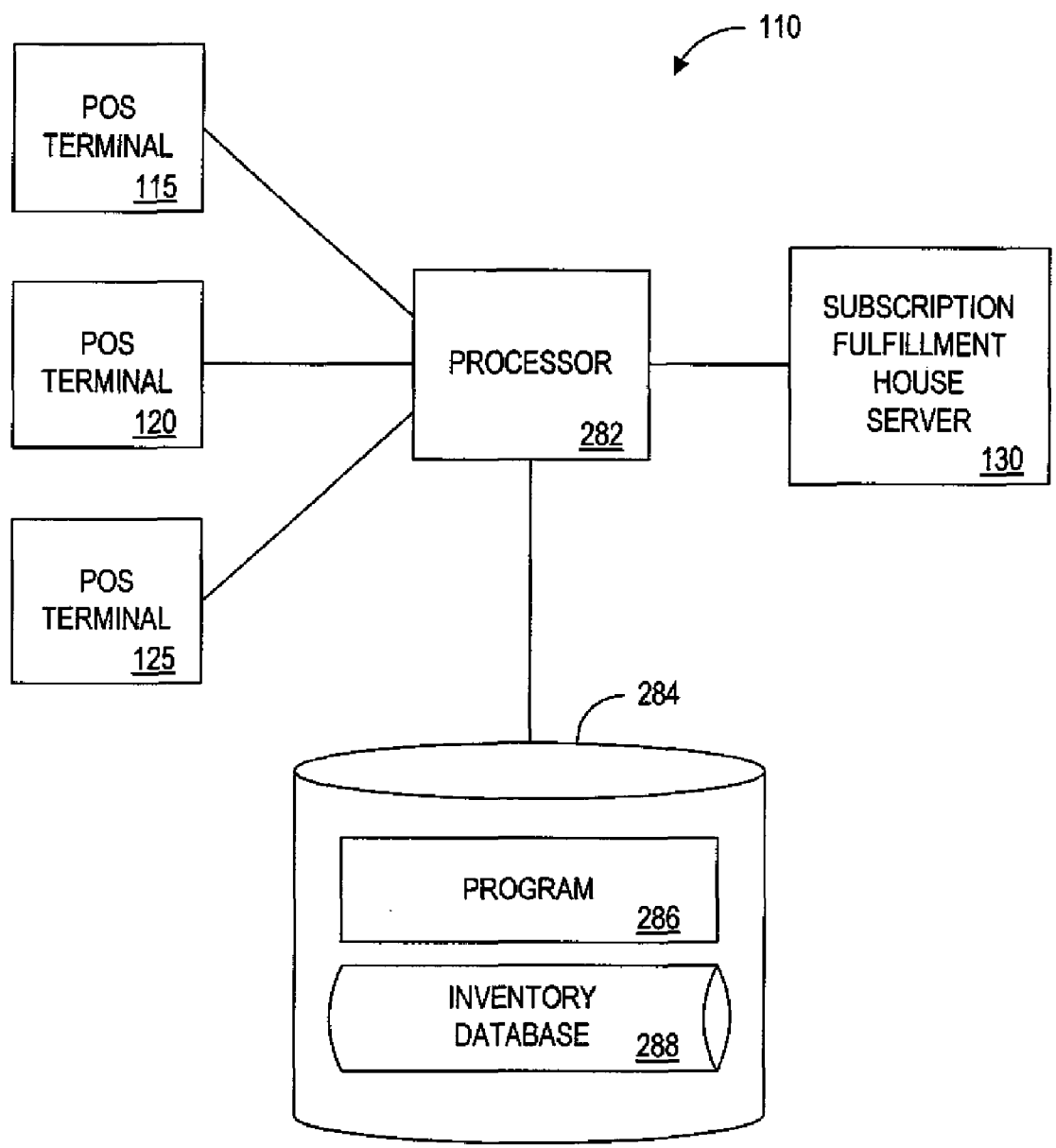
FIG. 2C is a schematic illustration of a store server of the apparatus of FIG. 1.

FIG. 2C illustrates an embodiment of the store server 110 (FIG. 1). The store server 110 comprises a processor 282, such as one or more Pentium® microprocessors. The processor 282 is in communication with a data storage device 284. The data storage device 284 comprises an appropriate combination of magnetic, optical and/or semiconductor memory, and may include Random Access Memory (RAM), Read-Only Memory (ROM) and/or a hard disk. The processor 282 and the storage device 284 may each be (i) located entirely within a single computer or other computing device; (ii) connected to each other by a remote communication medium such as a serial port cable, telephone line or radio frequency transceiver; or (iii) a combination thereof. In one embodiment the store server 110 may comprise one or more computers that are connected to a remote server computer for maintaining databases.

The data storage device 284 stores a program 286 for controlling the processor 282. The processor 282 performs instructions of the program 286 and thereby operates in accordance with the present invention, particularly in accordance with the methods described in detail herein. The program 286 furthermore includes program elements that may be necessary such as an operating system and "device drivers" for allowing the processor 282 to interface with computer peripheral devices such as input devices and output devices. Appropriate device drivers and other necessary program elements are known to those skilled in the art and need not be described in detail herein.

The storage device 284 also stores an inventory database 288. The inventory database 288 may be a "master copy" that is copied to each POS terminal in communication with the store server 110. Thus, inventory information stored by the store server 110 may be readily disseminated to each POS terminal. In another embodiment, the store server alone may maintain the inventory information in the inventory database 288, while each POS terminal would request appropriate inventory information from the store server 110 without actually having a local copy of the inventory database.

Figure 3:
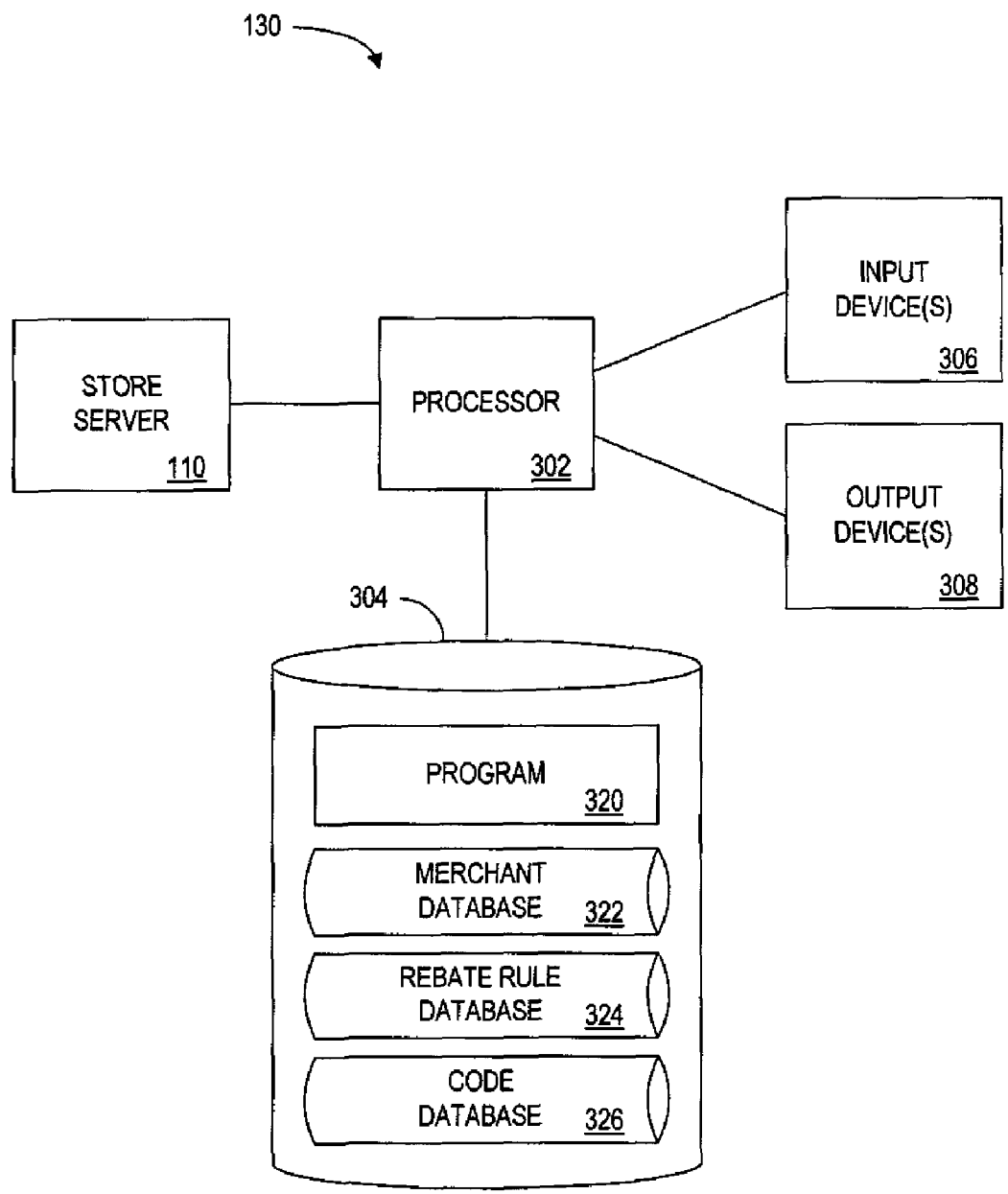
FIG. 3 is a schematic illustration of a subscription fulfillment house server of the apparatus of FIG. 1.

FIG. 3 illustrates an embodiment of the subscription fulfillment house server 130 (FIG. 1). The subscription fulfillment house server 130 comprises a processor 302, such as one or more Pentium® microprocessors. The processor 302 is in communication with a data storage device 304. The data storage device 304 comprises an appropriate combination of magnetic, optical and/or semiconductor memory, and may include Random Access Memory (RAM), Read-Only Memory (ROM) and/or a hard disk. The processor 302 and the storage device 304 may each be (i) located entirely within a single computer or other computing device; (ii) connected to each other by a remote communication medium such as a serial port cable, telephone line or radio frequency transceiver; or (iii) a combination thereof. In one embodiment, the subscription fulfillment house server 130 may comprise one or more computers that are connected to a remote server computer for maintaining databases.

The processor 302 may be in communication with one or more input devices 306 such as a keypad operative to transmit input signals to the processor 302. Similarly, the processor 302 may be in communication with one or more output devices 308 such as a display device that is controlled by the processor 302.

The data storage device 304 stores a program 320 for controlling the processor 302. The processor 302 performs instructions of the program 320, and thereby operates in accordance with the present invention, and particularly in accordance with the methods described in detail herein. The program 320 furthermore includes program elements that may be necessary such as an operating system and "device drivers" for allowing the processor 302 to interface with computer peripheral devices such as input devices and output devices. Appropriate device drivers and other necessary program elements are known to those skilled in the art and need not be described in detail herein.

The storage device 304 also stores (i) a merchant database 322, (ii) a rebate rule database 324, and (iii) a code database 326. Information stored in the databases 322, 324 and 326 may be made available to the store server 110 and/or the POS terminals 115, 120 and 125. Alternatively, the databases 322, 324 and 326 may be stored on the store server 110. The databases 322, 324 and 326 are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information, and those skilled in the art will understand that the number and content of the entries can be different from those illustrated herein.

Referring to FIG. 4, a table 400 represents an embodiment of the inventory database 222 (FIG. 2A). The table 400 includes entries 402, 404 and 406, each defining an item of inventory that a merchant offers for sale. Typically, each of a plurality of merchants will have its own inventory database. Those skilled in the art will understand that the table 400 may include any number of entries. The table 400 also defines fields for each of the entries 402, 404 and 406. The fields specify (i) an item identifier 420 that uniquely identifies the item, (ii) a description 422 of the item, and (iii) a price 424 of the item.

Referring to FIG. 5, a table 500 represents an embodiment of the merchant database 322 (FIG. 3). The table 500 includes entries 502, 504, 506 and 508, each defining a merchant that is in communication with the subscription fulfillment house server 130. Those skilled in the art will understand that the table 500 may include any number of entries. The table 500 also defines fields for each of the entries 502, 504, 506 and 508. The fields specify (i) a merchant identifier 520 that uniquely identifies the merchant, (ii) a merchant name 522, (iii) a merchant account identifier 524 that identifies an account which may be used to transfer finds to or receive funds from the merchant, and (iv) an amount of funds owed 526 to the merchant by the subscription fulfillment house. As described below, in one embodiment such funds owed may be due to rebates that the merchant will provide on behalf of the subscription fulfillment house.

Referring to FIG. 6, a table 600 represents an embodiment of the rebate rule database 324 (FIG. 3). The table 600 includes entries 602, 604, 606 and 608, each defining a rebate rule that specifies when a rebate is to be offered to a customer. As described below, rebates are offered via POS terminals that are (directly or indirectly) in communication with the subscription fulfillment house server 130 (FIG. 1). Those skilled in the art will understand that the table 600 may include any number of entries. The table 600 also defines fields for each of the entries 602, 604, 606 and 608. The fields specify (i) a rebate rule identifier 620 that uniquely identifies the rebate rule; (ii) an item identifier 622 that identifies an item which, when purchased, triggers an offer for a rebate; (iii) a rebate amount 624 that defines an amount of money to be paid to the customer if the customer subscribes to a specified periodical; (iv) a required subscription 626 that defines, for example, the required periodical and subscription term necessary to receive the rebate amount; (v) a rebate message 628 that the POS terminal outputs when a rebate is to be offered; and (vi) a contact identifier 630 that specifies a telephone number, email address and/or Uniform Resource Locator (URL) which the customer may use to purchase a subscription to the specified periodical.

Referring to FIG. 7, a table 700 represents an embodiment of the code database 326 (FIG. 3). The table 700 includes entries 702, 704, 706 and 708, each defining a code that may be provided with an offer for a rebate to a customer and in turn redeemed by the customer when the customer subsequently purchases a subscription to a periodical. Those skilled in the art will understand that the table 700 may include any number of entries. The table 700 also defines fields for each of the entries 702, 704, 706 and 708. The fields specify (i) a code identifier 720 that uniquely identifies the code, (ii) an indication of whether the code has been issued 722 (i.e. whether the code is associated with an offer for a rebate) and if so when, (iii) an expiration date 724 that defines a time period after which the offer for the rebate is no longer valid, (iv) an indication of whether the code has been redeemed 726 (i.e. whether the rebate has been provided to the customer) and if so when, (v) an issuing merchant 728, (vi) a rebate rule identifier 730 that identifies the rebate rule that specified the rebate (if any) associated with the code, and (vii) a rebate amount 732. Other types of information may be stored in the code database 326. For example, entries of the code database 326 may specify the item purchased by the customer receiving the offer for the rebate, a credit card number used to pay for the item, the required periodical the customer must subscribe to in order to redeem the code, and a customer identifier (e.g. credit card number, frequent shopper number) that uniquely identifies the customer.

As described herein, when the customer purchases the item from the issuing merchant, the code is provided to the customer (e.g. the code is printed on a receipt). Thereafter, the code may be redeemed in purchasing a subscription to a periodical. In one embodiment, the code may only be redeemed during a period of validity, such as between the date of issue and the expiration date.

In the embodiment of the code database 326 illustrated in FIG. 7, each entry defines a code that may or may not be issued. In such an embodiment, there may be a set of predetermined codes, and codes are issued as needed. For example, the entry 702 specifies a code that has not been issued, as indicated by the corresponding field 722.

In another embodiment codes need not be allocated from a set of predetermined codes. Codes may instead be generated as needed. In such an embodiment, each entry of the code database 326 could define a code that has been generated and that represents an offered rebate.

In still another embodiment, codes may be generated by encrypting at least one datum. Data that are encrypted to generate the code may include information that is represented in the code database of FIG. 7. In such an embodiment, it may not be necessary to have a code database that stores such data since the code itself would store the data. For example, the code database in such an embodiment may only store for each code an indication of whether the code has been redeemed.

In the embodiment of the code database 326 illustrated by FIG. 7, the customer received the rebate amount upon using the code in purchasing a subscription. In another embodiment described below, the customer may receive the rebate amount a significant time after the code is used in purchasing a subscription. In such an embodiment, the code could be considered redeemed when the customer receives the rebate amount.

Referring to FIG. 8, a table 800 represents another embodiment of the code database 326 (FIG. 3). In the illustrated embodiment, each of entries 802, 804, 806 and 808 defines a code that may be provided with an offer for a rebate to a customer. Each code may be used in purchasing a subscription, and then the rebate amount is provided at a time that is possibly well after the subscription is purchased. Those skilled in the art will understand that the table 800 may include any number of entries. The table 800 also defines fields for each of the entries 802, 804, 806 and 808. The fields specify (i) a code identifier 820 that uniquely identifies the code, (ii) an indication of whether the code has been issued 822 (i.e. whether the code is associated with an offer for a rebate) and if so when, (iii) an expiration date 824 that defines a time period after which the offer for the rebate is no longer valid, (iv) an indication of whether the required subscription was purchased 826 and if so when, (v) an indication of whether the code has been redeemed 828 (i.e. whether the rebate has been provided to the customer) and if so when, (vi) an issuing merchant 830, (vii) a rebate rule identifier 832 that identifies the rebate rule that specified the rebate (if any) associated with the code, and (viii) a rebate amount 834.

Figure 9:
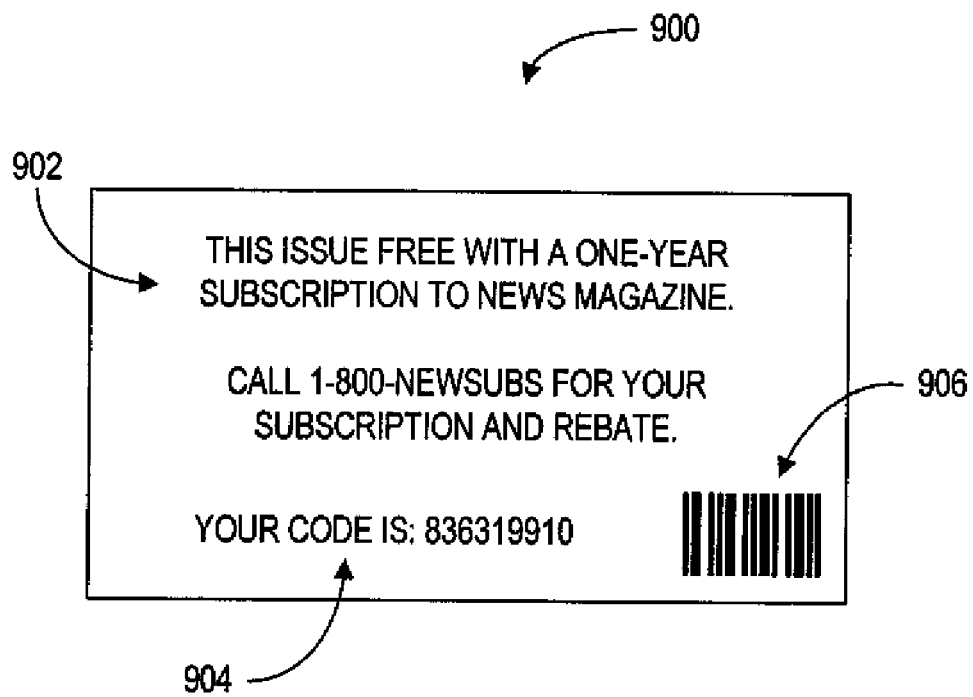
FIG. 9 is a front plan view of a coupon printed in accordance with the present invention.

Referring to FIG. 9, a coupon 900 that is printed in accordance with the present invention includes indicia 902 that represent a message, indicia 904 that represent a code and indicia 906 in the form of a bar code. The coupon 900 may be printed on a receipt by a POS terminal in a manner apparent to those skilled in the art. The message can generally describe the offer for a rebate in exchange for establishing a subscription to a periodical. The message may provide information such as a contact identifier and a required periodical. The bar code may represent, for example, the code.

Referring to FIG. 10, a table 1000 represents charges and credits made to an exemplary credit card account. The exemplary account is identified by credit card account number 1002. Entries 1004, 1006 and 1008 each define a transaction (charge or credit) to the account. Those skilled in the art will understand that the table 1000 may include any number of entries. The table 1000 also defines fields for each of the entries 1004, 1006 and 1008. The fields specify (i) a description 1020 of the transaction, for example a merchant from which a purchase was made; (ii) a date 1022 of the transaction; and (iii) an amount 1024 of the transaction.

The exemplary account represented by table 1000 illustrates a purchase at "Merchant Q" of $22.89 (entry 1004), a subsequent subscription to News Magazine for $12.95 (entry 1006), and a rebate of $3.50 which is the issue price of an issue previously purchased at "Merchant Q" (entry 1008).

The description of each transaction may be generated by the party receiving the credit card account number and processing the account transaction. For example, the subscription fulfillment house server 130 may generate a textual description of the rebate amount, and this textual description would be printed on a billing statement of the credit card account. Thus, the customer would be better informed as to the nature of the credit. Such a textual description of the rebate amount could include an indication of the periodical subscribed to, the item that was previously purchased, and/or a merchant from which the item was previously purchased.

Figure 11:
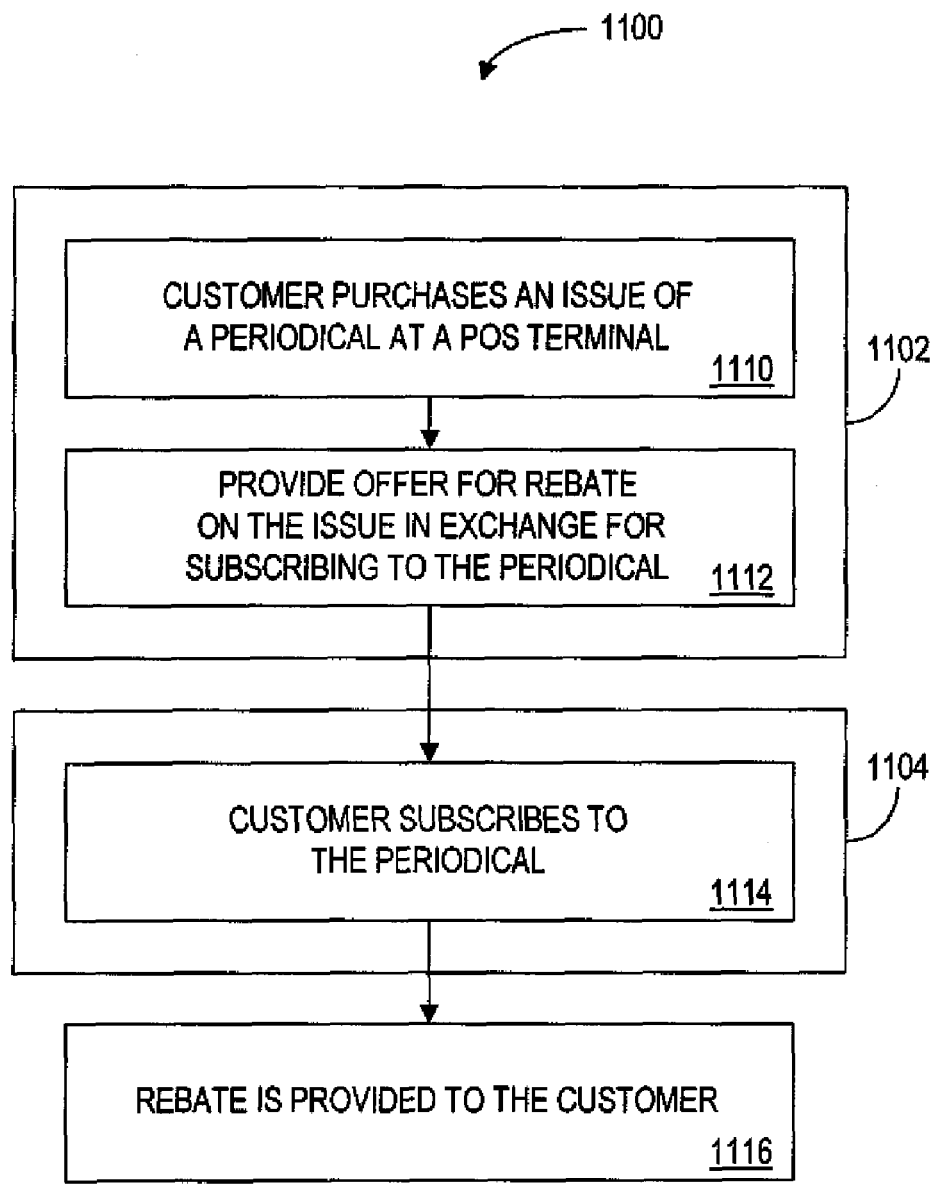
FIG. 11 is a flow chart illustrating an embodiment of a method for facilitating the sale of a subscription to a periodical in accordance with the present invention.

Referring to FIG. 11, a flow chart 1100 illustrates an embodiment of a method for facilitating the sale of a subscription to a periodical in accordance with the present invention. A first stage 1102 of the method occurs at a POS terminal, e.g., in a retail store. A second stage 1104 occurs subsequently and at a different location.

At the POS terminal, the customer purchases an issue of a periodical (step 1110). The customer is then provided with an offer for a rebate on the issue in exchange for subscribing to the periodical (step 1112). Subsequently, the customer subscribes to the periodical (step 1114) and the rebate is provided to the customer (step 1116).

Figure 12:
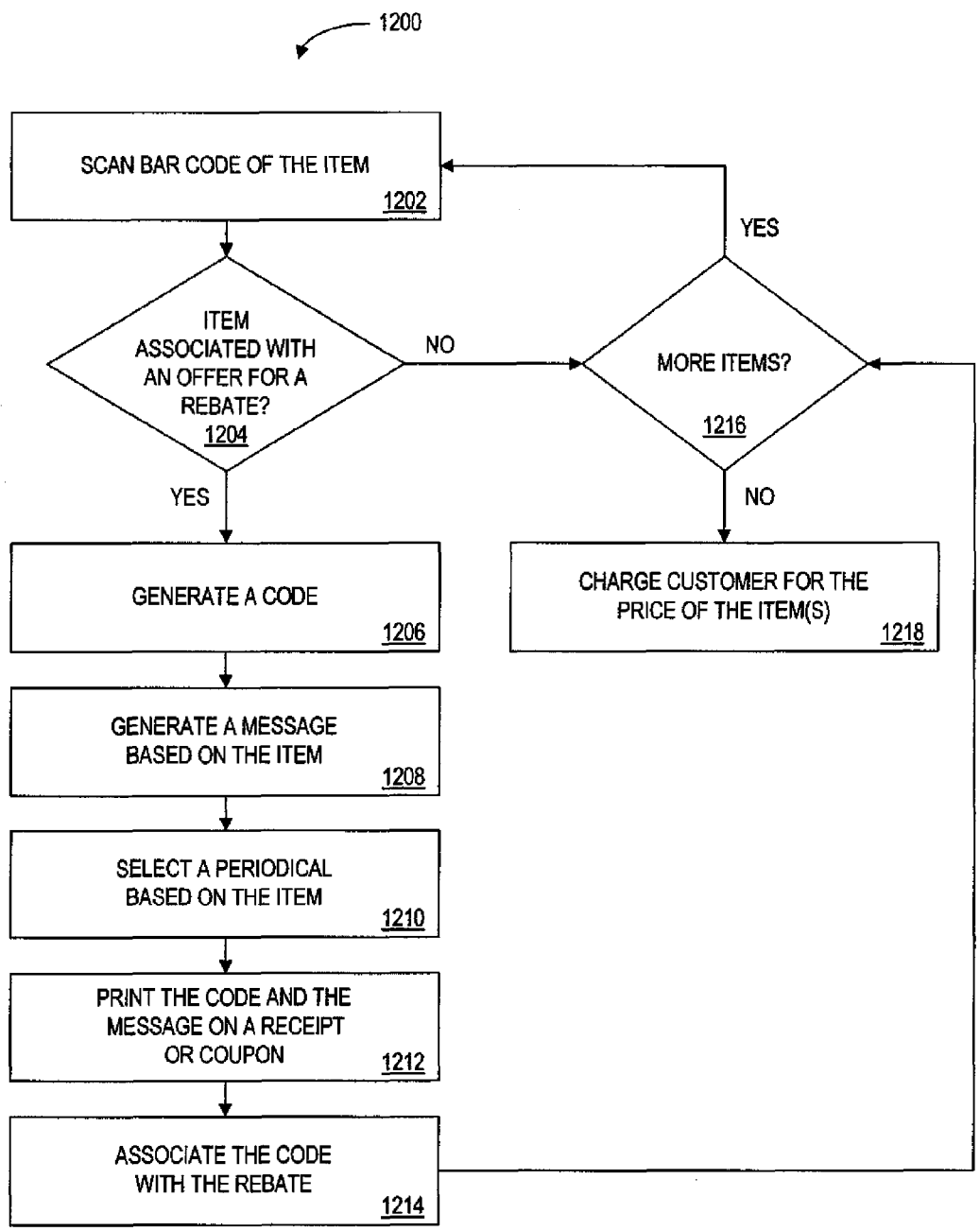
FIG. 12 is a flow chart illustrating an embodiment of a method for providing an offer for a rebate on an item in exchange for subscribing to a periodical.

Referring to FIG. 12, a flow chart 1200 illustrates an embodiment of a method for providing an offer for a rebate on an item in exchange for subscribing to a periodical. The illustrated method corresponds generally to steps 1110 and 1112 of FIG. 11.

The bar code of an item the customer desires to purchase is scanned (step 1202). Typically, the POS includes a bar code scanner that optically scans a bar code of the item, generates a signal that indicates the item, and transmits the signal to the processor and/or data storage device of the POS terminal. The POS terminal then ascertains whether the item is associated with an offer for a rebate (step 1204). The POS terminal may search a database (e.g. the rebate rule database 324) for a record (e.g. an entry such as the entry 602 of FIG. 6) that corresponds to the item, and then ascertain from the record whether the item is associated with an offer for a rebate.

For example, if there is no record in the database that corresponds to the item, then the item is not associated with an offer for a rebate. The POS terminal may search either a database stored locally thereon, or a database of a remote device such as a store server or the subscription fulfillment house server. Those skilled in the art will realize further ways to ascertain whether the item is associated with an offer for a rebate.

In addition to ascertaining whether the item is associated with an offer for a rebate, in one embodiment the POS terminal may further ascertain whether any of a number of predetermined rules are satisfied. For example, rules may define time restrictions (e.g. must be early morning) or total purchase price restrictions (e.g. total price>$20.00). If the rule or rules are satisfied, then the code may be generated as described below.

If the item is associated with an offer for a rebate, then a code is generated (step 1206). In one embodiment, the code is generated randomly. For example, a code may comprise twenty randomly generated digits or alphanumeric characters. In another embodiment, the code may be selected from a plurality of predetermined codes. For example, the table 700 represents an embodiment of the code database 326 in which a plurality of predetermined codes are either issued or not issued. Codes that are not issued are free for selection.

In still another embodiment, the code may be generated by encrypting one or more data. Then the data could be determined from the code without reference to the code database 326 (FIG. 3). For example, the POS terminal may encrypt an identifier that indicates the periodical, an item price of the item, an account identifier, a merchant identifier that identifies the merchant selling the item, a period of validity of the code, an item identifier that identifies the item, and/or a customer identifier that identifies the customer, Several encryption techniques known to those skilled in the art such as a block cipher technique may be used to encrypt data to form a code. Encryption techniques are described in "Applied Cryptography: Protocols, Algorithms, and Source Code in C", by Bruce Schneier.

A message is generated based on the item (step 1208). In one embodiment, the message is selected from a plurality of predetermined messages. For example, the rebate rule database 324 includes entries that specify for each rebate rule an item and a corresponding message. Purchase of the item triggers a rebate rule and thus specifies a message.

A periodical is also selected based on the item (step 1210). In one embodiment, the rebate rule database 324 includes entries that specify for each rebate rule an item and a corresponding required periodical. Purchase of the item triggers a rebate rule and thus specifies a required periodical.

The POS terminal includes a printer that prints the code and the message on a receipt or a coupon (step 1212). Alternatively, the POS terminal may display the message, for example, on a video monitor. The code is associated with the rebate (step 1214). In one embodiment, the code is associated with the rebate by creating an appropriate entry in the code database 326 that includes the code and information about the rebate. Thus, the rebate may be determined from the code.

At step 1216, it is determined whether there are more items to scan. For example, a cashier operating the POS terminal may press a "SUBTOTAL" or similar key to indicate that there are no more items. If there are more items, then the bar code of the next item is scanned (step 1202). If there are not any more items, then the customer is charged for the price of the item(s). The customer typically pays by using cash, a check or a credit card account.

Figure 13:
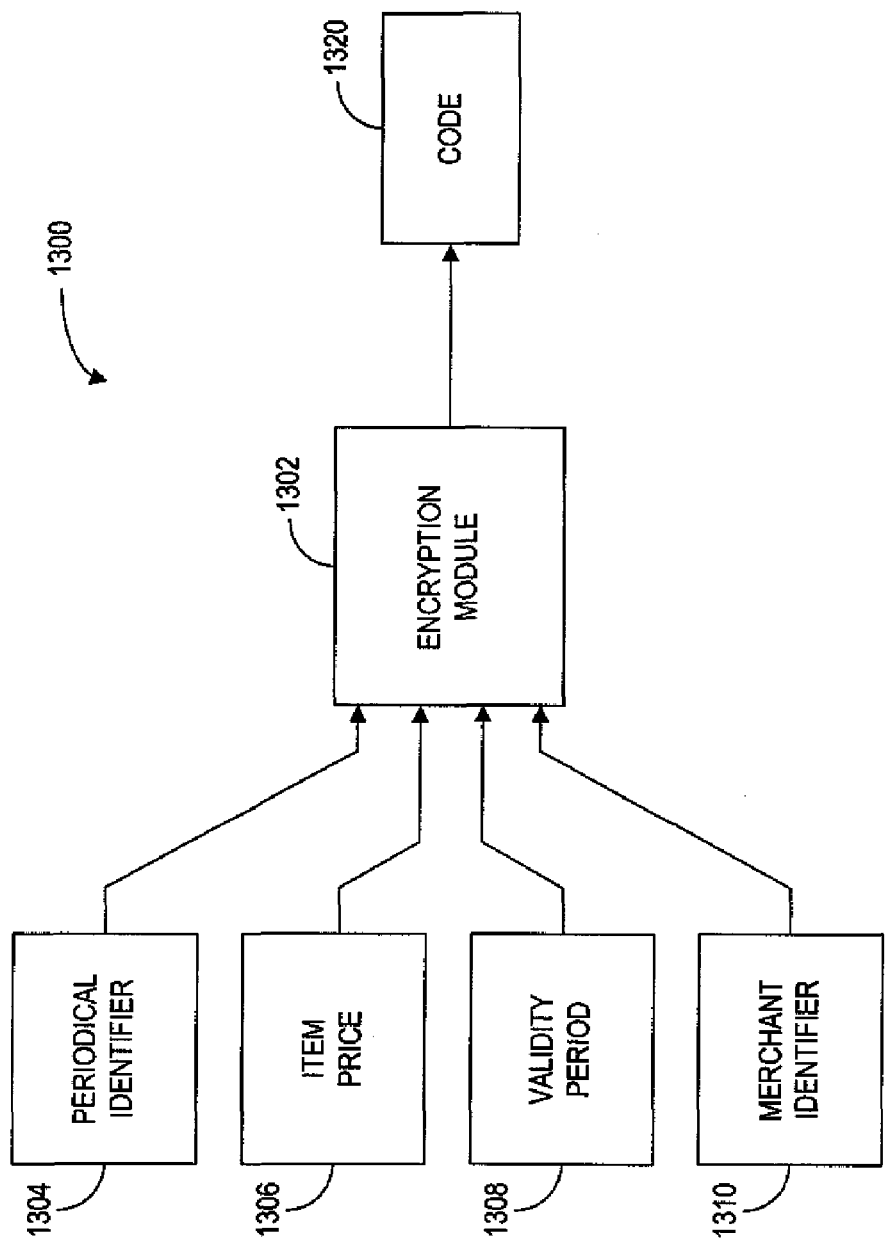
FIG. 13 is a diagram illustrating a method for generating a code.

Referring to FIG. 13, a diagram 1300 schematically illustrates a method for generating a code by encrypting various data. Those skilled in the art will understand various ways to implement an encryption module 1302 in hardware and/or software. The encryption module 1302 encrypts a periodical identifier 1304, an item price 1306, a validity period 1308 and a merchant identifier 1310 to generate a code 1320.

Figure 14:
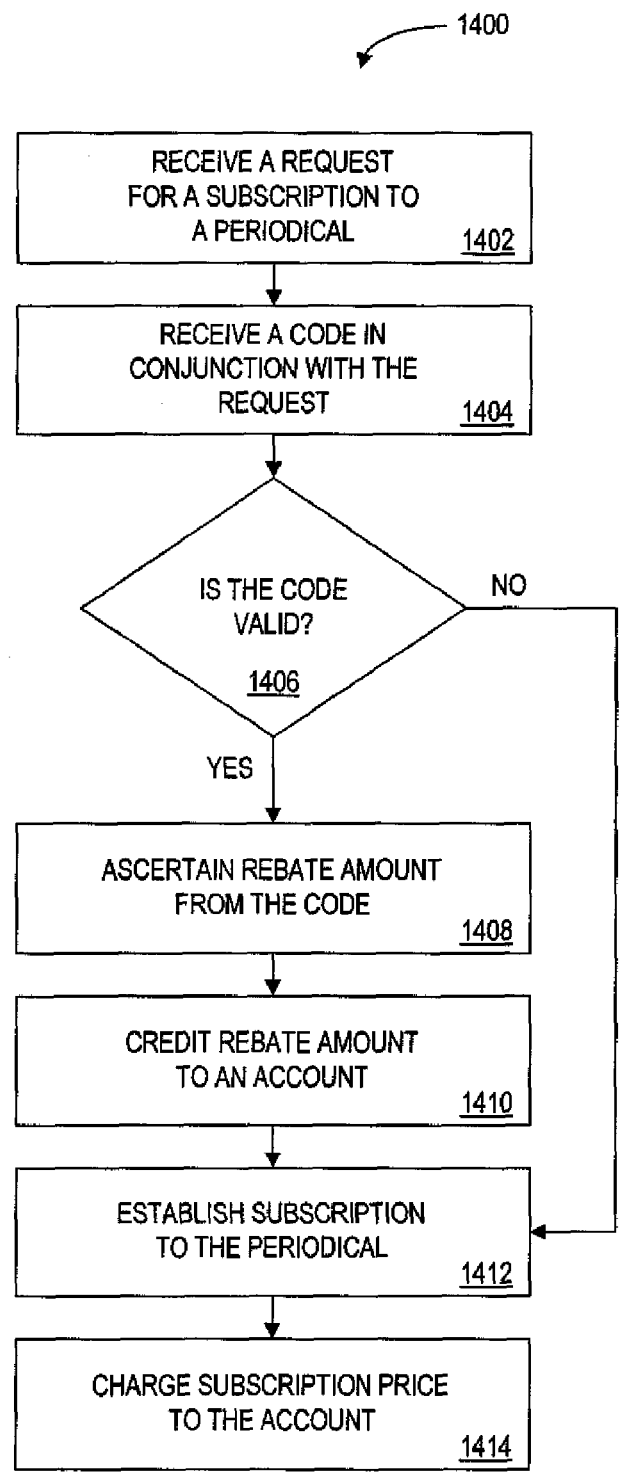
FIG. 14 is a flow chart illustrating an embodiment of a method for establishing a subscription and obtaining a rebate.

Referring to FIG. 14, a flow chart 1400 illustrates an embodiment of a method for establishing a subscription and obtaining a rebate. The illustrated method corresponds generally to the step 1114 of FIG. 11.

A request for a subscription to a periodical is received (step 1402). For example, the customer may use a telephone to access an interactive voice response unit (IVRU) that processes the request. Such an IVRU may be controlled by the subscription fulfillment house server 130 (FIG. 1). The customer may also communicate with an operator who in turn enters the request into a terminal that is in communication with the subscription fulfillment house server 130. Alternatively, the request may be received via a web server that receives requests via the Internet. Such a web server may interact with customers via electronic mail or via a form on a web site that is controlled by the web server.

A code is also received in conjunction with the request (step 1404). The code may be entered in the same way as the request. For example, in an IVRU embodiment, the IVRU may prompt the customer to enter the code by using the buttons of his telephone. In such an embodiment, actuating the buttons of the telephone would cause dual tone multi-frequency (DTMF) signals to be generated and transmitted to the IVRU.

In still another embodiment, the code and the request may be received via postal mail. For example, a receipt may have printed thereon a form for requesting a subscription to a periodical, as well as the code. Such a receipt could be printed during the transaction in which the issue of the periodical was purchased. The code or indicia on the receipt could indicate a means of payment (e.g. a credit card number) Alternatively, a check could be mailed in with the receipt.

The subscription fulfillment house server 130 then ascertains whether the code is valid (step 1406). In one embodiment, ascertaining whether the code is valid comprises searching for the code in the code database 326 to determine whether the code has been issued. It can also be desirable to ascertain whether the code corresponds to the periodical. If the code corresponds to another periodical, then the instant request for a subscription does not fulfill the requirements of the code. The code database can likewise indicate a required periodical that corresponds to the code. For example, the entry 706 WIG. 7) indicates that the rebate rule "R01" corresponds to the code "123456789". The rebate rule "R01" in turn corresponds to the required subscription "News Magazine for at least a twelve month term", as indicated by the entry 602.

Ascertaining whether the code is valid may also comprise ascertaining whether the code is at least one of a set of predetermined codes. For example, the code database 326 may be searched to determine if the code is specified by any entry thereof. In another embodiment, the code may be evaluated to ascertain whether the code has certain features. For example, only codes that include seventeen digits and are divisible by a certain number are valid.

Ascertaining whether the code is valid may also comprise ascertaining a period of validity of the code, and ascertaining whether the period of validity has elapsed. For example, the code database 326 may be searched to determine an expiration date of the code. The expiration date would indicate an end of the period of validity. The period of validity would be elapsed if the current date were after the expiration date. The current date may be maintained by the processor of the POS terminal and/or the processor of the subscription fulfillment house server.

Ascertaining whether the code is valid may also comprise decrypting the code using any of a number of known decryption techniques described, e.g., in "Applied Cryptography: Protocols, Algorithms, and Source Code in C", by Bruce Schneier. By decrypting the code, various types of information may be ascertained from the code. For example, decrypting the code can yield the periodical, an item price of at least one item, an account, a merchant identifier that identifies a merchant, a period of validity, an item identifier that identifies the at least one item, and/or a customer identifier that identifies a customer.

If the code is valid, a rebate amount is ascertained from the code (step 1408). The rebate amount may be ascertained by decrypting the code, as described above. Alternatively, the code may correspond to a rebate amount in the code database 326. For example, the entry 708 of FIG. 7 indicates that the code "836319910" corresponds to a rebate amount of $6.75. The rebate amount is credited to an account (step 1410) such as a credit card account that is indicated by a credit card number provided by the customer.

A subscription to the periodical is established for the customer (step 1412) in a manner known in the art. Thus, the customer will be mailed issues periodically. The subscription price is likewise charged to the account (step 1414).

Figure 15:
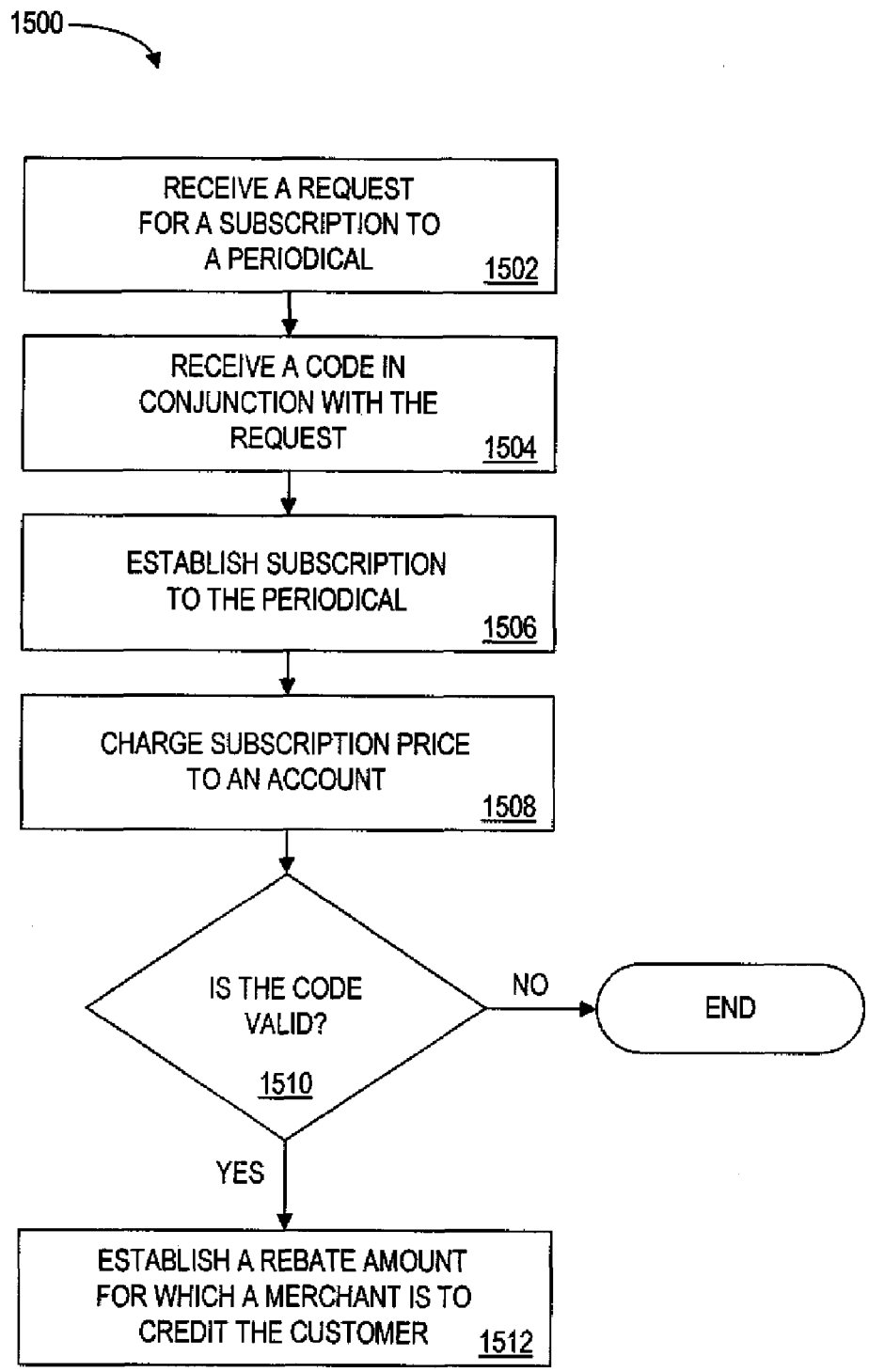
FIG. 15 is a flow chart illustrating an embodiment of a method for establishing a subscription and establishing a rebate to be provided by a merchant.

Referring to FIG. 15, a flow chart 1500 illustrates an embodiment of a method for establishing a subscription and establishing a rebate to be provided by a merchant. The flow chart 1500 is generally similar to the flow chart 1400. Rather than crediting the rebate amount to the customer's account, however, the rebate will be applied to a customer account by the merchant at a later time.

As described above, a request for a subscription to a periodical is received (step 1502) form a customer, and a code is also received in conjunction with the request (step 1504). A subscription to the periodical is established for the customer (step 1506) in a manner known in the art. The subscription price is likewise charged to an account (step 1508) such as a credit card account.

If it is ascertained at step 1510 that the code is valid, then the subscription fulfillment house server 130 (FIG. 1) establishes a rebate amount for which a merchant is to credit the customer (step 1512). Establishing the rebate amount may comprise making an appropriate entry in a database such as the code database. For example, referring again to FIG. 8, the entry 806 defines a code "998877665" that was used at 11:23 AM on Aug. 21, 2001 in conjunction with the request and purchase of a subscription. This code also defines a rebate amount of $6.75 that is to be credited to the customer when the code is redeemed at a merchant "M001". When the code is redeemed (e.g. during a subsequent purchase), then the price charged for the subsequent purchase is reduced by the rebate amount of $6.75.

Figure 16:
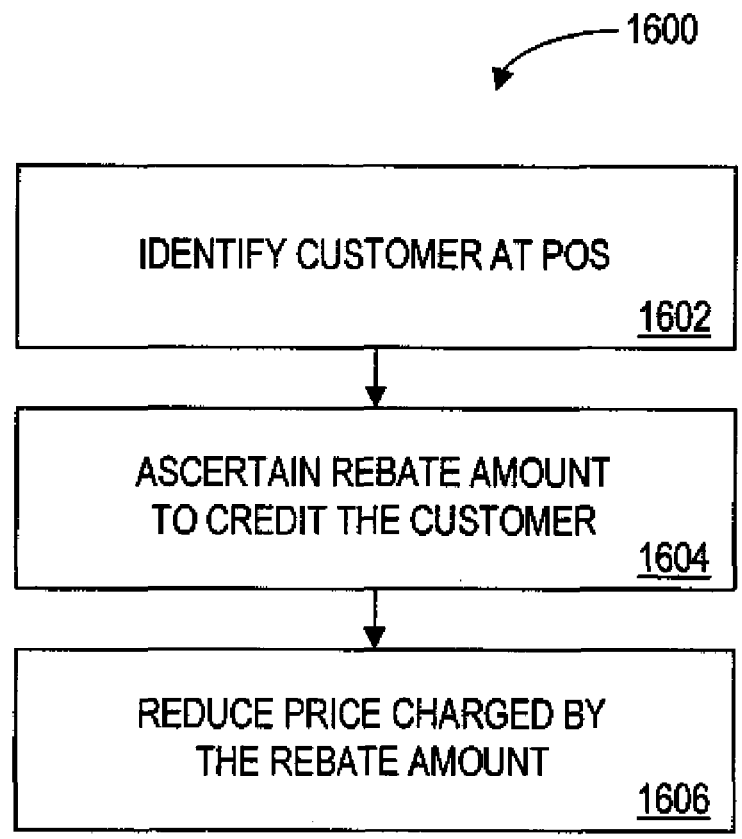
FIG. 16 is a flow chart illustrating an embodiment of a method for providing a rebate at a point of sale terminal.

Referring to FIG. 16, a flow chart 1600 illustrates an embodiment of a method for providing a rebate at a point of sale terminal of the merchant. The customer is identified at the point of sale (step 1602) in any of a number of ways. For example, the POS terminal may read a frequent shopper card or credit card of the customer. From the card, the POS terminal may determine a customer identifier such as a frequent shopper identifier or credit card number that uniquely identifies the customer.

In another embodiment, the customer may be identified by reading a coupon or receipt provided by the customer. The coupon may include indicia representing the code. For example, a bar code registered on the coupon may be read by a bar code scanner, which transmits a signal that represents the code to the POS terminal processor. As described above, such a coupon may have been provided to the customer when the customer purchased an item that triggered the rebate offer.

The POS terminal then ascertains a rebate amount to credit to the customer (step 1604). The rebate amount may be ascertained from the code, if any code is provided. As described above with reference to step 1512, the code database may indicate a rebate amount for each code. The rebate amount may also be associated with the customer identifier. For example, there may be a customer database, similar to the code database described above, which stores rebate amounts corresponding to each customer. From the database, it may be determined whether a subscription was established for the customer.

The price charged to the customer is then reduced by the rebate amount (step 1606). For example, if the customer purchases items that normally cost $14.00 and the rebate amount is $6.75, then the price charged is reduced to $7.25 ($14.00-$6.75=$7.25). The reduced price may be charged to an account of the customer (e.g. a credit card account). Alternatively, the price charged may reflect the combination of a $14.00 charge to the account and a $6.75 credit to the account. In another embodiment, the customer may pay the reduced price in other ways besides a using credit card account. For example, the customer may pay with cash or a check as is known to those skilled in the art.

Although the present invention has been described with respect to a preferred embodiment thereof, those skilled in the art will note that various substitutions may be made to those embodiments described herein without departing from the spirit and scope of the present invention. For example, the rebate amount need not be the price of the previously-purchased issue. In one embodiment the rebate amount may be based on the price of a plurality of issues. A parent case of the present application, patent application Ser. No. 09/136,147, entitled "METHOD AND APPARATUS FOR ESTABLISHING A SUBSCRIPTION TO A PERIODICAL", filed on Aug. 18, 1998, describes a method and apparatus for providing free issues that may be incorporated with the present invention to provide free issues in exchange for establishing a subscription to a periodical.

What is claimed is:

1. A method, comprising:
   receiving a signal indicative of at least one item being purchased by a customer at a point of sale terminal;
   determining, by a computer processor, that the at least one item is associated with an offer for an amount in exchange for establishing a subscription to a periodical, wherein the subscription to the periodical is different from the item; and
   providing the offer to the customer.

2. The method of claim 1, further comprising crediting the amount to at least one of a customer credit card account, debit card account, bank account, and financial account, if the customer accepts the offer to subscribe to the periodical.

3. The method of claim 1, further comprising reducing a purchase price by the amount if the customer accepts the offer to subscribe to the periodical.

4. The method of claim 1, further comprising reducing a price associated with a subsequent purchase if the customer accepts the offer to subscribe to the periodical.

5. The method of claim 4, in which reducing the price comprises:
   receiving a code;
   determining from the code whether a subscription was established; and
   authorizing a price reduction if the subscription was established.

6. The method of claim 1, wherein the amount is a rebate amount.

7. The method of claim 1, in which determining the offer comprises:
   receiving the signal indicative of the at least one item at a processor of at least one of the point of sale terminal, a store server, and a subscription fulfillment house server; and
   determining that the signal corresponds to an item identifier stored in a database.

8. The method of claim 1, further comprising, prior to providing the offer, identifying the customer.

9. The method of claim 8, further comprising charging an account associated with the customer for the subscription if the customer accepts the offer.

10. The method of claim 8, in which identifying the customer comprises obtaining data from at least one of a frequent shopper card, a coupon, and a receipt provided by the customer.

11. The method of claim 8, in which identifying the customer comprises:
    receiving credit card data from a credit card; and
    determining a customer identifier from the credit card data that uniquely identifies the customer.

12. The method of claim 8, further comprising determining at least a portion of the amount to offer based on a purchasing history of the customer.

13. The method of claim 8, in which identifying the customer comprises determining at least one of a customer name, a mailing address, and customer contact information.

14. The method of claim 1, further comprising, before providing the offer, determining an amount by utilizing at least one of a code obtained from the customer, a database entry that is associated with a code, and a database entry associated with a customer identifier.

15. The method of claim 1, in which providing the offer comprises at least one of displaying a message on a display device, printing an indicia corresponding to a message, providing a receipt, and providing a coupon.

16. The method of claim 1, in which providing the offer comprises selecting an offer message to display based on at least one of the at least one item being purchased, the identity of the customer, and a periodical subscription status of the customer.

17. The method of claim 1, further comprising, prior to providing the offer, determining at least one of a periodical to which the customer must agree to subscribe, and that an expiration date for providing the offer is valid.

18. The method of claim 1, further comprising:
    receiving a request for a subscription for the periodical and a code;
    determining if the code is valid; and
    establishing the subscription for the periodical if the code is valid.

19. The method of claim 18, further comprising charging a subscription fee for the periodical to an account of the customer.

20. The method of claim 18, in which determining if the code is valid comprises at least one of determining whether the code corresponds to a periodical subscription code, determining whether the code matches at least one of a set of predetermined codes, and determining whether the code matches at least one predetermined feature.

21. The method of claim 18, further comprising providing the amount to the customer.

22. The method of claim 21, in which providing the amount further comprises marking the code as redeemed in a code database.

23. A computer readable medium storing instructions for directing a computer to:
    receive a signal indicative of at least one item being purchased by a customer at a point of sale terminal;
    determine that the at least one item is associated with an offer for an amount in exchange for establishing a subscription to a periodical, wherein the subscription to the periodical is different from the item; and
    provide the offer to the customer.

24. The computer readable medium of claim 23, further comprising instructions configured to direct the processor to credit the amount to at least one of a customer credit card account, debit card account, bank account, and financial account, if the customer accepts the offer to subscribe to the periodical.

25. The computer readable medium of claim 23, further comprising instructions configured to direct the processor to reduce a purchase price by the amount if the customer accepts the offer to subscribe to the periodical.

26. The computer readable medium of claim 23, further comprising instructions configured to direct the processor to reduce a price associated with a subsequent purchase if the customer accepts the offer to subscribe to the periodical.

27. The computer readable medium of claim 26, in which the instructions for reducing the price comprise instructions configured to direct the processor to:
  receive a code;
  determine from the code whether a subscription was established; and
  authorize a price reduction if the subscription was established.

28. The computer readable medium of claim 23, in which the instructions for determining the offer comprise instructions configured to direct the processor to :
  receive the signal indicative of the at least one item; and
  determine that the signal corresponds to an item identifier stored in a database.

29. The computer readable medium of claim 23, further comprising instructions configured to direct the processor to identify the customer prior to providing the offer.

30. The computer readable medium of claim 29, further comprising instructions configured to direct the processor to charge an account associated with the customer for the subscription if the customer accepts the offer.

31. The computer readable medium of claim 29, in which the instructions for identifying the customer further comprise instructions for directing the processor to obtain data from at least one of a frequent shopper card, a coupon, and a receipt provided by the customer.

32. The computer readable medium of claim 29, in which the instructions for identifying the customer further comprise instructions for directing the processor to:
  receive credit card data from a credit card; and
  determine a customer identifier from the credit card data that uniquely identifies the customer.

33. The computer readable medium of claim 29, further comprising instructions configured to direct the processor to determine at least a portion of the amount to offer based on a purchasing history of the customer.

34. The computer readable medium of claim 29, in which the instructions for identifying the customer further comprise instructions for directing the processor to determine at least one of a customer name, a mailing address, and customer contact information.

35. The computer readable medium of claim 23, further comprising instructions configured to direct the processor to determine an amount by utilizing at least one of a code obtained from the customer, a database entry that is associated with a code, and a database entry associated with a customer identifier.

36. The computer readable medium of claim 23, in which the instructions for providing the offer further comprise instructions for directing the processor to at least one of display a message on a display device, print an indicia corresponding to a message, provide a receipt, and provide a coupon.

37. The computer readable medium of claim 23, in which the instructions for providing the offer further comprise instructions for directing the processor to select an offer message to display based on at least one of the at least one item being purchased, the identity of the customer, and a periodical subscription status of the customer.

38. The computer readable medium of claim 23, further comprising instructions configured to direct the processor to determine at least one of a periodical to which the customer must agree to subscribe, and that an expiration date for providing the offer is valid.

39. The computer readable medium of claim 23, further comprising instructions configured to direct the processor to:
  receive a request for a subscription for the periodical and a code;
  determine if the code is valid; and
  establish the subscription for the periodical if the code is valid.

40. The computer readable medium of claim 39, further comprising instructions configured to direct the processor to charge a subscription fee for the periodical to an account of the customer.

41. The computer readable medium of claim 39, in which the instructions for determining if the code is valid further comprise instructions configured to direct the processor to at least one of determine whether the code corresponds to a periodical subscription code, determine whether the code matches at least one of a set of predetermined codes, and determine whether the code matches at least one predetermined feature.

42. The computer readable medium of claim 39, further comprising instructions configured to direct the processor to provide the amount to the customer.

43. The computer readable medium of claim 42, in which the instructions for providing the amount further comprise instructions configured to direct the processor to mark the code as redeemed in a code database.

44. An apparatus, comprising:
  a processor; and
  a memory connected to the processor, the memory for storing a program operative with the processor to:
    receive a signal indicative of at least one item being purchased by a customer at a point of sale terminal;
    determine that the at least one item is associated with an offer for an amount in exchange for establishing a subscription to a periodical, wherein the subscription to the periodical is different from the item; and
    provide the offer to the customer.

45. A method, comprising:
  receiving a signal indicating at least one item being purchased by a customer;
  determining, by a computer processor, that the at least one item is associated with at least one offer for an amount in exchange for establishing a subscription to a periodical, wherein the subscription to the periodical is different from the at least one item;
  providing the offer to the customer;
  providing the amount to the customer if the customer accepts the offer to subscribe to the periodical; and
  determining an amount owed by a subscription fulfillment house to a merchant.

46. The method of claim 45, in which receiving the signal comprises obtaining the signal from at least one of a keypad, a keyboard, a card reader, and a scanner.

47. The method of claim 45, in which providing the amount comprises reducing a price of a subsequent purchase by the customer.

48. The method of claim 45, in which determining the amount owed by the subscription fulfillment house to the merchant comprises:
  determining a merchant identifier corresponding to the merchant; and
  crediting a merchant account corresponding to the merchant identifier, wherein the credit is based on the amount provided to the customer.

49. The method of claim 48, which further comprises periodically crediting the merchant account.

50. The method of claim 45, in which providing the offer comprises providing a message at a point of sale terminal.

51. The method of claim 50, wherein the message comprises at least one of an offer amount to be paid to the customer in exchange for subscribing to the periodical, a description of the periodical and subscription terms, a contact identifier, and an expiration date of the offer.

52. A computer readable medium storing instructions for implementing a method, the instructions directing a computer to:
receive a signal indicating at least one item being purchased by a customer;
determine that the at least one item is associated with at least one offer for an amount in exchange for establishing a subscription to a periodical, wherein the subscription to the periodical is different from the at least one item;
provide the offer to the customer;
provide the amount to the customer if the customer accepts the offer to subscribe to the periodical; and
determine an amount owed by a subscription fulfillment house to a merchant.

53. The computer readable medium of claim 52, in which the instructions for providing the amount to the customer comprise instructions configured to direct the processor to reduce a price of a subsequent purchase by the customer.

54. The computer readable medium of claim 52, in which the instructions for determining the amount owed by the subscription fulfillment house to the merchant comprise instructions configured to direct the processor to:
determine a merchant identifier corresponding to the merchant; and
credit a merchant account corresponding to the merchant identifier, wherein the credit is based on the amount provided to the customer.

55. The computer readable medium of claim 54, further comprising instructions configured to direct the processor to periodically credit the merchant account.

56. The computer readable medium of claim 52, in which the instructions for providing the offer comprise instructions configured to direct the processor to provide a message at a point of sale terminal.

57. The computer readable medium of claim 52, in which the instructions for reducing the price further comprise instructions configured to direct the processor to reduce the price of a subsequent purchase by the customer.

58. An apparatus, comprising:
a processor; and
a memory connected to the processor, the memory for storing a program operative with the processor to:
receive a signal indicating at least one item being purchased by a customer;
determine that the at least one item is associated with at least one offer for an amount in exchange for establishing a subscription to a periodical, wherein the subscription to the periodical is different from the at least one item;
provide the offer to the customer;
provide the amount to the customer if the customer accepts the offer to subscribe to the periodical; and
determine an amount owed by a subscription fulfillment house to a merchant.

* * * * *